United States Patent
Malecki et al.

(10) Patent No.: US 10,138,128 B2
(45) Date of Patent: *Nov. 27, 2018

(54) SYSTEM AND METHOD FOR SURFACE TREATMENT AND BARRIER COATING OF FIBERS FOR IN SITU CNT GROWTH

(71) Applicant: APPLIED NANOSTRUCTURED SOLUTIONS, LLC, Baltimore, MD (US)

(72) Inventors: Harry C. Malecki, Jupiter, FL (US); Mark R. Alberding, Glen Arm, MD (US); Brandon K. Malet, Washington, DC (US); Tushar K. Shah, Fulton, MD (US)

(73) Assignee: APPLIED NANOSTRUCTURED SOLUTIONS, LLC, Baltimore, MD (US)

( * ) Notice: Subject to any disclaimer, the term of this patent is extended or adjusted under 35 U.S.C. 154(b) by 573 days.

This patent is subject to a terminal disclaimer.

(21) Appl. No.: 14/174,715

(22) Filed: Feb. 6, 2014

(65) Prior Publication Data

US 2014/0154412 A1 Jun. 5, 2014
US 2017/0240425 A9 Aug. 24, 2017

Related U.S. Application Data

(63) Continuation of application No. 12/713,146, filed on Feb. 25, 2010.

(Continued)

(51) Int. Cl.
*H05H 1/00* (2006.01)
*C01B 32/16* (2017.01)
(Continued)

(52) U.S. Cl.
CPC ............ *C01B 32/16* (2017.08); *B01J 21/185* (2013.01); *B01J 23/745* (2013.01);
(Continued)

(58) Field of Classification Search
CPC . B82Y 40/00; C01B 31/0226; C01B 31/0233; C01B 31/024; H01J 29/04; H01J 29/481; H01J 2329/00; H01J 2201/30469
See application file for complete search history.

(56) References Cited

U.S. PATENT DOCUMENTS

| | | |
|---|---|---|
| 2,412,707 A | 12/1946 | Barnett |
| 3,304,855 A | 2/1967 | Oebell |

(Continued)

FOREIGN PATENT DOCUMENTS

| | | |
|---|---|---|
| CA | 2476861 | 9/2003 |
| CN | 1345694 A | 4/2002 |

(Continued)

OTHER PUBLICATIONS

Callender et al; Aqueous Synthesis of Water-Soluble Alomoxanes: Environmentally Benign Precursors to Alumina and Aluminum-Based Ceramics; Chem. Mater, vol. 9, No. 11; pp. 2418-2433; 1997. (Year: 1997).*

(Continued)

*Primary Examiner* — Michael P Wieczorek

(57) ABSTRACT

A system for synthesizing carbon nanotubes (CNT) on a fiber material includes a surface treatment system adapted to modify the surface of the fiber material to receive a barrier coating upon which carbon nanotubes are to be grown, a barrier coating application system downstream of the surface treatment system adapted to apply the barrier coating to the treated fiber material surface, and a barrier coating curing system downstream of the barrier coating application (Continued)

systems for partially curing the applied barrier coating to enhance reception of CNT growth catalyst nanoparticles.

8 Claims, 13 Drawing Sheets

Related U.S. Application Data

(60) Provisional application No. 61/182,153, filed on May 29, 2009, provisional application No. 61/157,096, filed on Mar. 3, 2009.

(51) Int. Cl.
| | | |
|---|---|---|
| *B01J 21/18* | (2006.01) | |
| *B01J 23/745* | (2006.01) | |
| *B01J 35/00* | (2006.01) | |
| *B01J 37/02* | (2006.01) | |
| *B82Y 30/00* | (2011.01) | |
| *B82Y 40/00* | (2011.01) | |
| *D06B 1/02* | (2006.01) | |
| *D06B 3/10* | (2006.01) | |
| *D06B 19/00* | (2006.01) | |
| *D06M 11/74* | (2006.01) | |
| *C01B 32/162* | (2017.01) | |

(52) U.S. Cl.
CPC ....... *B01J 35/0013* (2013.01); *B01J 37/0219* (2013.01); *B82Y 30/00* (2013.01); *B82Y 40/00* (2013.01); *C01B 32/162* (2017.08); *D06B 1/02* (2013.01); *D06B 3/10* (2013.01); *D06B 19/00* (2013.01); *D06M 11/74* (2013.01); *Y10S 977/842* (2013.01); *Y10T 428/2495* (2015.01); *Y10T 428/25* (2015.01)

(56) References Cited

U.S. PATENT DOCUMENTS

| | | | |
|---|---|---|---|
| 4,300,821 A | 11/1981 | Mignen | |
| 4,515,107 A | 5/1985 | Fournier et al. | |
| 4,530,750 A | 7/1985 | Aisenberg et al. | |
| 4,566,969 A | 1/1986 | Klein | |
| 4,707,349 A | 11/1987 | Hjersted | |
| 4,759,950 A | 7/1988 | Stevens | |
| 4,797,378 A | 1/1989 | Sowman | |
| 4,920,917 A | 5/1990 | Nakatani et al. | |
| 5,093,155 A | 3/1992 | Miyazaki et al. | |
| 5,130,194 A | 7/1992 | Baker et al. | |
| 5,173,367 A | 12/1992 | Liimatta et al. | |
| 5,221,605 A | 6/1993 | Bard et al. | |
| 5,225,659 A | 7/1993 | Kusano et al. | |
| 5,238,808 A | 8/1993 | Bard et al. | |
| 5,246,794 A | 9/1993 | Blomgren et al. | |
| 5,310,687 A | 5/1994 | Bard et al. | |
| 5,470,408 A | 11/1995 | Nielson et al. | |
| 5,514,217 A | 5/1996 | Niino et al. | |
| 5,547,525 A | 8/1996 | Bennett et al. | |
| 5,571,749 A | 11/1996 | Matsuda et al. | |
| 5,589,007 A | 12/1996 | Fujioka et al. | |
| 5,595,750 A | 1/1997 | Jacobson et al. | |
| 5,639,984 A | 6/1997 | Nielson | |
| 5,714,089 A | 2/1998 | Bard et al. | |
| 5,731,147 A | 3/1998 | Bard et al. | |
| 5,764,004 A | 6/1998 | Rabinowitz | |
| 5,780,101 A | 7/1998 | Nolan et al. | |
| 5,789,848 A * | 8/1998 | Dworsky | H01J 1/3042 |
| | | | 313/292 |
| 5,908,585 A | 6/1999 | Shibuta | |
| 5,968,274 A | 10/1999 | Fujioka et al. | |
| 5,997,832 A | 12/1999 | Lieber et al. | |
| 6,072,930 A | 6/2000 | Kornreich et al. | |
| 6,140,138 A | 10/2000 | Bard et al. | |
| 6,146,462 A | 11/2000 | Yializis et al. | |
| 6,146,642 A | 11/2000 | Garcia-Sastre et al. | |
| 6,184,280 B1 | 2/2001 | Shibuta | |
| 6,221,154 B1 | 4/2001 | Lee et al. | |
| 6,232,706 B1 | 5/2001 | Dai et al. | |
| 6,251,520 B1 | 6/2001 | Blizzard et al. | |
| 6,270,897 B1 | 8/2001 | Flautt et al. | |
| 6,331,209 B1 | 12/2001 | Jang et al. | |
| 6,333,016 B1 | 12/2001 | Resasco et al. | |
| 6,344,232 B1 | 2/2002 | Jones et al. | |
| 6,346,189 B1 | 2/2002 | Dai et al. | |
| 6,361,861 B2 | 3/2002 | Gao et al. | |
| 6,413,487 B1 | 7/2002 | Resasco et al. | |
| 6,420,293 B1 | 7/2002 | Chang et al. | |
| 6,440,277 B1 | 8/2002 | D'Amato | |
| 6,455,021 B1 | 9/2002 | Saito | |
| 6,465,057 B1 | 10/2002 | Nakahigashi et al. | |
| 6,479,028 B1 | 11/2002 | Kaner et al. | |
| 6,491,789 B2 | 12/2002 | Niu | |
| 6,495,258 B1 | 12/2002 | Chen et al. | |
| 6,528,572 B1 | 3/2003 | Patel et al. | |
| 6,564,744 B2 | 5/2003 | Nakahigashi et al. | |
| 6,653,619 B2 | 11/2003 | Chin et al. | |
| 6,673,392 B2 | 1/2004 | Lee et al. | |
| 6,692,717 B1 | 2/2004 | Smalley et al. | |
| 6,765,949 B2 | 7/2004 | Chang | |
| 6,790,425 B1 | 9/2004 | Smalley et al. | |
| 6,818,821 B2 | 11/2004 | Fujieda et al. | |
| 6,837,928 B1 | 1/2005 | Zhang et al. | |
| 6,852,410 B2 | 2/2005 | Veedu et al. | |
| 6,863,942 B2 | 3/2005 | Ren et al. | |
| 6,887,451 B2 | 5/2005 | Dodelet et al. | |
| 6,900,264 B2 | 5/2005 | Kumar et al. | |
| 6,900,580 B2 | 5/2005 | Dai et al. | |
| 6,908,572 B1 | 6/2005 | Derbyshire et al. | |
| 6,913,075 B1 | 7/2005 | Knowles et al. | |
| 6,934,600 B2 | 8/2005 | Jang et al. | |
| 6,936,653 B2 | 8/2005 | McElrath et al. | |
| 6,955,800 B2 | 10/2005 | Resasco et al. | |
| 6,962,892 B2 | 11/2005 | Resasco et al. | |
| 6,967,013 B2 | 11/2005 | Someya et al. | |
| 6,979,709 B2 | 12/2005 | Smalley et al. | |
| 6,986,853 B2 | 1/2006 | Glatkowski et al. | |
| 6,986,877 B2 | 1/2006 | Takikawa et al. | |
| 6,994,907 B2 | 2/2006 | Resasco et al. | |
| 7,011,760 B2 | 3/2006 | Wang et al. | |
| 7,018,600 B2 | 3/2006 | Yanagisawa et al. | |
| 7,022,776 B2 | 4/2006 | Bastiaens et al. | |
| 7,045,108 B2 | 5/2006 | Jiang et al. | |
| 7,056,452 B2 | 6/2006 | Niu et al. | |
| 7,074,294 B2 | 7/2006 | Dubrow | |
| 7,094,386 B2 | 8/2006 | Resasco et al. | |
| 7,105,596 B2 | 9/2006 | Smalley et al. | |
| 7,108,841 B2 | 9/2006 | Smalley et al. | |
| 7,118,693 B2 | 10/2006 | Glatkowski et al. | |
| 7,125,533 B2 | 10/2006 | Khabashesku et al. | |
| 7,125,534 B1 | 10/2006 | Smalley et al. | |
| 7,132,621 B2 | 11/2006 | Kumar et al. | |
| 7,144,563 B2 | 12/2006 | Rao et al. | |
| 7,148,619 B2 | 12/2006 | Den et al. | |
| 7,151,129 B2 | 12/2006 | Ishikawa et al. | |
| 7,153,452 B2 | 12/2006 | Ogale et al. | |
| 7,157,068 B2 | 1/2007 | Li et al. | |
| 7,160,531 B1 | 1/2007 | Jacques et al. | |
| 7,160,532 B2 | 1/2007 | Liu et al. | |
| 7,211,320 B1 | 5/2007 | Cooper et al. | |
| 7,226,643 B2 | 6/2007 | Juang et al. | |
| 7,235,159 B2 | 6/2007 | Gu et al. | |
| 7,239,073 B2 | 7/2007 | Takikawa et al. | |
| 7,253,442 B2 | 8/2007 | Huang et al. | |
| 7,261,779 B2 | 8/2007 | Gardner | |
| 7,265,174 B2 | 9/2007 | Carroll et al. | |
| 7,265,175 B2 | 9/2007 | Winey et al. | |
| 7,268,174 B2 * | 9/2007 | Smith | C08G 59/30 |
| | | | 523/400 |
| 7,278,324 B2 | 10/2007 | Smits et al. | |
| 7,294,302 B2 | 11/2007 | Koide et al. | |
| 7,329,698 B2 | 2/2008 | Noguchi et al. | |
| 7,338,684 B1 | 3/2008 | Curliss et al. | |

(56) References Cited

U.S. PATENT DOCUMENTS

| | | |
|---|---|---|
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,419,601 B2 | 9/2008 | Cooper et al. |
| 7,431,965 B2 | 10/2008 | Grigorian et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,494,639 B2 | 2/2009 | Marek et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,656,027 B2 | 2/2010 | Dangelo et al. |
| 7,666,915 B2 | 2/2010 | Zhang et al. |
| 7,687,981 B2 | 3/2010 | Parsapour |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,148,276 B2 | 4/2012 | Nejhad et al. |
| 8,168,291 B2 | 5/2012 | Shah et al. |
| 8,951,632 B2 * | 2/2015 | Shah ............... D02G 3/16 428/368 |
| 2002/0035170 A1 | 3/2002 | Glatkowski et al. |
| 2002/0085968 A1 | 7/2002 | Smalley et al. |
| 2002/0102201 A1 | 8/2002 | Colbert et al. |
| 2002/0197474 A1 | 12/2002 | Reynolds |
| 2003/0024884 A1 | 2/2003 | Petrik |
| 2003/0042147 A1 | 3/2003 | Talin et al. |
| 2003/0068432 A1 | 4/2003 | Dai et al. |
| 2003/0102585 A1 | 6/2003 | Poulin et al. |
| 2003/0111333 A1 | 6/2003 | Montgomery et al. |
| 2003/0157378 A1 | 8/2003 | Mizuno et al. |
| 2003/0175003 A1 | 9/2003 | Gasca et al. |
| 2004/0007955 A1 | 1/2004 | Yaniv et al. |
| 2004/0009115 A1 | 1/2004 | Wee et al. |
| 2004/0026234 A1 | 2/2004 | Vanden Brande et al. |
| 2004/0037767 A1 | 2/2004 | Adderton et al. |
| 2004/0079278 A1 | 4/2004 | Kamins et al. |
| 2004/0082247 A1 | 4/2004 | Desai et al. |
| 2004/0089237 A1 | 5/2004 | Pruett et al. |
| 2004/0105807 A1 | 6/2004 | Fan et al. |
| 2004/0173506 A1 | 9/2004 | Doktycz et al. |
| 2004/0184981 A1 | 9/2004 | Liu et al. |
| 2004/0194707 A1 | 10/2004 | Takahashi et al. |
| 2004/0245088 A1 | 12/2004 | Gardner |
| 2004/0247808 A1 | 12/2004 | Cooper et al. |
| 2004/0253167 A1 | 12/2004 | Silva et al. |
| 2005/0009694 A1 | 1/2005 | Watts et al. |
| 2005/0026778 A1 | 2/2005 | Axtell et al. |
| 2005/0090176 A1 | 4/2005 | Dean et al. |
| 2005/0093458 A1 | 5/2005 | Babayan et al. |
| 2005/0100501 A1 | 5/2005 | Veedu et al. |
| 2005/0112052 A1 | 5/2005 | Gu et al. |
| 2005/0119105 A1 | 6/2005 | Zimmer et al. |
| 2005/0119371 A1 | 6/2005 | Drzal et al. |
| 2005/0147553 A1 | 7/2005 | Wong et al. |
| 2005/0164169 A1 | 7/2005 | Malak |
| 2005/0170089 A1 | 8/2005 | Lashmore et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0191490 A1 | 9/2005 | Ton-That et al. |
| 2005/0215164 A1 | 9/2005 | Mueller et al. |
| 2005/0238566 A1 | 10/2005 | Rao et al. |
| 2005/0245622 A1 | 11/2005 | Beijense et al. |
| 2005/0260412 A1 | 11/2005 | Gardner |
| 2005/0263456 A1 | 12/2005 | Cooper et al. |
| 2005/0279274 A1 | 12/2005 | Niu et al. |
| 2005/0287064 A1 | 12/2005 | Mayne et al. |
| 2006/0002844 A1 | 1/2006 | Suenaga et al. |
| 2006/0052509 A1 | 3/2006 | Saitoh |
| 2006/0062944 A1 | 3/2006 | Gardner et al. |
| 2006/0067871 A1 | 3/2006 | Hart et al. |
| 2006/0083674 A1 | 4/2006 | Maruyama et al. |
| 2006/0083927 A1 | 4/2006 | Von Ehr |
| 2006/0104890 A1 | 5/2006 | Harutyunyan et al. |
| 2006/0108906 A1 | 5/2006 | Gosain et al. |
| 2006/0110599 A1 | 5/2006 | Honma et al. |
| 2006/0121275 A1 | 6/2006 | Poulin et al. |
| 2006/0134329 A1 | 6/2006 | Wei et al. |
| 2006/0159916 A1 | 7/2006 | Dubrow et al. |
| 2006/0165914 A1 | 7/2006 | Abrahamson |
| 2006/0166003 A1 | 7/2006 | Khabashesku et al. |
| 2006/0172179 A1 | 8/2006 | Gu et al. |
| 2006/0177602 A1 | 8/2006 | Dijon et al. |
| 2006/0198956 A1 | 9/2006 | Eres |
| 2006/0205304 A1 | 9/2006 | Marzolin et al. |
| 2006/0239894 A1 | 10/2006 | Kurachi et al. |
| 2007/0009421 A1 | 1/2007 | Kittrell et al. |
| 2007/0020167 A1 | 1/2007 | Han et al. |
| 2007/0035226 A1 | 2/2007 | Ganapathiraman et al. |
| 2007/0048521 A1 | 3/2007 | Istvan |
| 2007/0053824 A1 | 3/2007 | Subramanya et al. |
| 2007/0054105 A1 | 3/2007 | Hsiao |
| 2007/0090489 A1 | 4/2007 | Hart et al. |
| 2007/0092431 A1 | 4/2007 | Resasco et al. |
| 2007/0099527 A1 | 5/2007 | Brun et al. |
| 2007/0103048 A1 | 5/2007 | Liu et al. |
| 2007/0104892 A1 | 5/2007 | Ishida et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0141114 A1 * | 6/2007 | Muisener ............ C09D 5/1693 424/427 |
| 2007/0148340 A1 | 6/2007 | Kalkanoglu et al. |
| 2007/0148429 A1 | 6/2007 | McGrath et al. |
| 2007/0183959 A1 | 8/2007 | Charlier et al. |
| 2007/0189953 A1 | 8/2007 | Bai et al. |
| 2007/0205394 A1 | 9/2007 | Furman et al. |
| 2007/0218280 A1 | 9/2007 | Yabuki et al. |
| 2007/0253890 A1 | 11/2007 | Nakayama et al. |
| 2007/0254488 A1 | 11/2007 | Huotari et al. |
| 2007/0259128 A1 | 11/2007 | Parsapour |
| 2007/0298669 A1 | 12/2007 | Barrera et al. |
| 2008/0014431 A1 | 1/2008 | Lashmore et al. |
| 2008/0017845 A1 | 1/2008 | Drndic et al. |
| 2008/0020193 A1 | 1/2008 | Jang et al. |
| 2008/0023396 A1 | 1/2008 | Fugetsu |
| 2008/0048364 A1 | 2/2008 | Armeniades et al. |
| 2008/0053922 A1 | 3/2008 | Honsinger et al. |
| 2008/0069760 A1 | 3/2008 | O'Brien et al. |
| 2008/0075954 A1 | 3/2008 | Wardle et al. |
| 2008/0118753 A1 | 5/2008 | Poulin et al. |

(56) References Cited

U.S. PATENT DOCUMENTS

| | | |
|---|---|---|
| 2008/0135815 A1 | 6/2008 | Glatkowski et al. |
| 2008/0155888 A1 | 7/2008 | Vick et al. |
| 2008/0160286 A1 | 7/2008 | Asrar et al. |
| 2008/0160302 A1 | 7/2008 | Asrar et al. |
| 2008/0164801 A1 | 7/2008 | Min et al. |
| 2008/0170982 A1 | 7/2008 | Zhang et al. |
| 2008/0178924 A1 | 7/2008 | Kempa et al. |
| 2008/0182108 A1 | 7/2008 | Curliss et al. |
| 2008/0187648 A1 | 8/2008 | Hart et al. |
| 2008/0213498 A1 | 9/2008 | Drzal et al. |
| 2008/0247938 A1 | 10/2008 | Tsai et al. |
| 2008/0247939 A1 | 10/2008 | Iyuke |
| 2008/0274036 A1 | 11/2008 | Resasco et al. |
| 2008/0279753 A1 | 11/2008 | Harutyunyan |
| 2008/0280031 A1 | 11/2008 | Drzal et al. |
| 2008/0280136 A1 | 11/2008 | Zachariah |
| 2008/0286564 A1 | 11/2008 | Tsotsis |
| 2008/0287598 A1 | 11/2008 | Lee |
| 2008/0290787 A1 | 11/2008 | Cok |
| 2008/0305329 A1 | 12/2008 | D'Silva et al. |
| 2008/0308209 A1 | 12/2008 | Loutfy et al. |
| 2009/0017301 A1 | 1/2009 | Moireau |
| 2009/0020734 A1 | 1/2009 | Jang et al. |
| 2009/0021136 A1* | 1/2009 | Coll ............... B82Y 10/00 313/496 |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0116798 A1 | 5/2009 | Blanchandin et al. |
| 2009/0121219 A1 | 5/2009 | Song et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0155451 A1 | 6/2009 | Ylitalo et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0202422 A1 | 8/2009 | Kajiura et al. |
| 2009/0212430 A1 | 8/2009 | Wyland |
| 2009/0214800 A1 | 8/2009 | Saito |
| 2009/0220409 A1* | 9/2009 | Curliss ............... B01J 6/008 423/447.2 |
| 2009/0258164 A1 | 10/2009 | Nakai et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2009/0311168 A1 | 12/2009 | Duvall |
| 2009/0318614 A1 | 12/2009 | Chevalier |
| 2009/0325377 A1 | 12/2009 | DiJon et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0081769 A1 | 4/2010 | Ma |
| 2010/0092841 A1 | 4/2010 | Lopez et al. |
| 2010/0098931 A1 | 4/2010 | Daniel et al. |
| 2010/0099319 A1 | 4/2010 | Lashmore et al. |
| 2010/0117764 A1 | 5/2010 | Wang et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0200208 A1 | 8/2010 | Cola et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0260931 A1 | 10/2010 | Malecki et al. |
| 2010/0260933 A1 | 10/2010 | Malecki et al. |
| 2010/0260998 A1 | 10/2010 | Waicukauski et al. |
| 2010/0261058 A1 | 10/2010 | Lopatin et al. |
| 2010/0271253 A1 | 10/2010 | Shah et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0014446 A1 | 1/2011 | Saito |
| 2011/0024409 A1 | 2/2011 | Shah et al. |
| 2011/0024694 A1 | 2/2011 | Shah et al. |
| 2011/0132245 A1 | 6/2011 | Shah et al. |
| 2011/0186775 A1 | 8/2011 | Shah et al. |
| 2011/0203927 A1 | 8/2011 | Draper et al. |
| 2011/0241244 A1 | 10/2011 | Liu |
| 2011/0242731 A1 | 10/2011 | Fleischer et al. |
| 2011/0256336 A1 | 10/2011 | Koike |
| 2012/0065300 A1 | 3/2012 | Shah et al. |
| 2012/0070667 A1 | 3/2012 | Malet et al. |
| 2012/0122020 A1 | 5/2012 | Hata et al. |
| 2012/0247800 A1 | 10/2012 | Shah et al. |
| 2012/0251432 A1 | 10/2012 | Cooper et al. |

FOREIGN PATENT DOCUMENTS

| | | |
|---|---|---|
| CN | 1379740 A | 11/2002 |
| CN | 1418260 A | 5/2003 |
| CN | 1477260 A | 2/2004 |
| CN | 1502553 A | 6/2004 |
| CN | 1504407 A | 6/2004 |
| CN | 1558441 A | 12/2004 |
| CN | 1696337 A | 11/2005 |
| CN | 1826286 A | 8/2006 |
| CN | 1919727 A | 2/2007 |
| CN | 101012621 A | 8/2007 |
| CN | 101049927 A | 10/2007 |
| CN | 101070250 A | 11/2007 |
| CN | 101095230 A | 12/2007 |
| CN | 101173386 A | 5/2008 |
| CN | 101177803 | 5/2008 |
| CN | 101177803 A | 5/2008 |
| CN | 101365830 A | 2/2009 |
| CN | 101372327 A | 2/2009 |
| CN | 101372329 A | 2/2009 |
| CN | 101378988 A | 3/2009 |
| CN | 101541860 A | 9/2009 |
| CN | 101698975 A | 4/2010 |
| CN | 101746717 A | 6/2010 |
| EP | 0098315 A1 | 1/1984 |
| EP | 1637828 A2 | 3/2006 |
| EP | 1939149 A2 | 7/2008 |
| GB | 2399092 A | 9/2004 |
| GB | 2458776 A | 10/2009 |
| IN | 01900DE2008 | 8/2008 |
| JP | S 57-117623 A | 7/1982 |
| JP | S 58-156512 A | 9/1983 |
| JP | 60-027700 | 2/1985 |
| JP | 01-283376 A | 11/1989 |
| JP | H04-334823 A | 11/1992 |
| JP | 08-192044 A | 7/1996 |
| JP | 09-012343 | 1/1997 |
| JP | H11-139815 A | 5/1999 |
| JP | 2000-058158 | 2/2000 |
| JP | 2000-309870 A | 11/2000 |
| JP | 2002-115071 A | 4/2002 |
| JP | 2003-502507 A | 1/2003 |
| JP | 2003-171108 A | 6/2003 |
| JP | 2003-201108 A | 7/2003 |
| JP | 2003-239171 A | 8/2003 |
| JP | 2004-002182 A | 1/2004 |
| JP | 2004-015600 A | 1/2004 |
| JP | 2004-059428 A | 2/2004 |
| JP | 2004-261875 A | 9/2004 |
| JP | 2004-265600 A | 9/2004 |
| JP | 2004-284919 A | 10/2004 |

(56) References Cited

FOREIGN PATENT DOCUMENTS

| | | |
|---|---|---|
| JP | 2004-284921 A | 10/2004 |
| JP | 2004-327085 A | 11/2004 |
| JP | 2005-162571 A | 6/2005 |
| JP | 2005-213700 A | 8/2005 |
| JP | 2005-219950 A | 8/2005 |
| JP | 2005-538026 A | 12/2005 |
| JP | 2006-007213 A | 1/2006 |
| JP | 2006-026533 A | 2/2006 |
| JP | 2006-057231 A | 3/2006 |
| JP | 2006-069816 A | 3/2006 |
| JP | 2006-255817 A | 9/2006 |
| JP | 2006-342011 A | 12/2006 |
| JP | 2007-091556 A | 4/2007 |
| JP | 2007-117881 A | 5/2007 |
| JP | 2007-523033 A | 8/2007 |
| JP | 2007-523822 A | 8/2007 |
| JP | 2007-524774 A | 8/2007 |
| JP | 2007-230832 A | 9/2007 |
| JP | 2008-063196 A | 3/2008 |
| JP | 2008-063718 A | 3/2008 |
| JP | 2008-520429 A | 6/2008 |
| JP | 2008-535752 A | 9/2008 |
| JP | 2008-535763 A | 9/2008 |
| JP | 2008-266057 A | 11/2008 |
| JP | 2008-296338 A | 12/2008 |
| JP | 2008-544939 A | 12/2008 |
| JP | 2009-021038 A | 1/2009 |
| JP | 2009-517531 A | 4/2009 |
| JP | 2009-215146 A | 9/2009 |
| JP | 2009-535530 A | 10/2009 |
| JP | 2009-537439 A | 10/2009 |
| JP | 2011-071049 A | 4/2011 |
| JP | 2012-503128 A | 2/2012 |
| KR | 100829001 B1 | 5/2008 |
| TW | 2090833861 | 8/2008 |
| TW | 201217827 A | 5/2012 |
| WO | WO-99/58756 | 11/1999 |
| WO | WO-01/039970 | 6/2001 |
| WO | WO-03/082733 A2 | 10/2003 |
| WO | WO-2004/071654 A1 | 8/2004 |
| WO | WO-2005/007564 A1 | 1/2005 |
| WO | WO-2005/012171 A2 | 2/2005 |
| WO | WO-2005/028174 A2 | 3/2005 |
| WO | WO-2005037470 A2 | 4/2005 |
| WO | WO-2005/044723 A2 | 5/2005 |
| WO | WO-2005/075341 A2 | 8/2005 |
| WO | WO-2006/048531 | 5/2006 |
| WO | WO-2006/064760 A1 | 6/2006 |
| WO | WO-2006/107144 | 10/2006 |
| WO | WO-2006/115486 | 11/2006 |
| WO | WO-2007/015710 A2 | 2/2007 |
| WO | WO-2007/020362 A2 | 2/2007 |
| WO | WO-2007/061854 A2 | 5/2007 |
| WO | WO-2007/089118 | 8/2007 |
| WO | WO-2007/130979 A2 | 11/2007 |
| WO | WO-2007/136755 A2 | 11/2007 |
| WO | WO-2007136613 A2 | 11/2007 |
| WO | WO-2007/149109 A2 | 12/2007 |
| WO | WO-2008/025750 A1 | 3/2008 |
| WO | WO-2008/041183 A2 | 4/2008 |
| WO | WO-2006/060685 A2 | 5/2008 |
| WO | WO-2008/054541 A2 | 5/2008 |
| WO | WO-2008/085634 | 7/2008 |
| WO | WO-2008/106143 A2 | 9/2008 |
| WO | WO-2008/115640 A2 | 9/2008 |
| WO | WO-2008/153609 | 12/2008 |
| WO | WO-2009/004346 | 1/2009 |
| WO | WO-2009/004348 A2 | 1/2009 |
| WO | WO-2009/008291 | 1/2009 |
| WO | WO-2009/027133 A2 | 3/2009 |
| WO | WO-2009/110865 | 9/2009 |
| WO | WO-2010/007163 A1 | 1/2010 |
| WO | WO-2010/081769 | 7/2010 |
| WO | WO-2010/087903 | 8/2010 |
| WO | WO-2010/129234 A2 | 11/2010 |
| WO | WO-2011/108492 A1 | 9/2011 |

OTHER PUBLICATIONS

Hou, et al., "Carbon nanotubes formed on carbonized electrospun polymer nanofibers," Polymer Preprints, 2003, pp. 63-64, vol. 44, No. 2.

Callender, et al., "Aqueous Synthesis of Water-Soluble Alumoxanes: Environmentally Benign Precursors to Alumina and Aluminum-Based Ceramics," Chem. Mater. 1997, pp. 2418-2433, vol. 9.

Smith, Jr., "Nanocomposite Films Derived from Alkoxysilane Terminated Amide Acid Oligomers and Carbon Nanotubes," Mat. Res. Soc. Symp. Proc., 2002, pp. T3.5.1-T3.5.5, Vot 733E.

Lu, "Rheological Behavior of Carbon Nanotube-Alumina Nanoparticle Dispersion Systems," Powder Technology, 2007, pp. 154-161; vol. 177.

"Aramid Fibers," DuPont Nemours Inc. Apr. 30, 2001, <http://www.chem.uwec.edu/Chem405_S01/maleniri/project.html>.

"Conformal coating," The Free Dictionary by Farlex, last viewed Jan. 15, 2013, retrieved from <http://encyclopedia.thefreedictionary.com/conformal+coating>.

Rowell, et al., "Organic Solar Cells with Carbon Nanotube Network Electrodes," online Jun. 6, 2006, vol. 86, Iss 33, p. 233506.

Ago, et al., "Colloidal Solution of Metal nanoparticles as a Catalyst for Carbon Nanotube Growth," Proceedings Materials Research Society, Fall 2000, pp. A13 18.13.18.5, vol. 633, Materials Research Society.

Andrews, et al., "Continuous Production of Allogned Carbon Nanotubes: A Step Closer to Commercial Realization," Chemical Physics Lettrs, Apr. 16, 1999, vol. 303, Iss 5-6, pp. 467-474.

Bubert, et al., "Basis analytical investigation of plasma-chemically modified carbon fibers," Spectrochimica Acta Part B, 2002. pp. 1601-1610, vol. 57. Elsevier Science B.V.

Chae, et al., "A comparison of reinforcement efficiency of various types of carbon nanotubes in polyacrylonitrile fiber," Polymer, Nov. 21, 2005, pp. 10925-10935. vol. 46, No. 24, Elsevier Ltd.

Che, et al., "Chemical Vapor Deposition Based Synthesis of Carbon Nanotubes and Nanofibers Using a Template Method," Chem. Mater, 1998, pp. 260-267, vol. 10, American Chemical Society.

Chen, et a., "Pulsed electrodeposition of Pl nanoclusters on carbon nanotubes modified carbon materials using diffusion restricting viscous electrolytes," Electrochemistry Communication, Jun. 2007, pp. 1348-1354, vol. 9, Elsevier B.V.

Chen, et al., "Basail fiber-epoxy laminates with functionalized multi-walled carbon nanotubes," Composites, Part A 2009, pp. 1082-1089 vol. 40, Elsevier Ltd.

Ci, et al., "Direct growth of carbon nanotubes on the surface of ceramic fibers," Carbon, Jan. 2005, vol. 43, No. 4. pp. 883-886.

Definition of nanoparticle provided by Dictionary.com <http://dictionary.reference/.com/browse/nanoparticle>, accessed Nov. 2, 2012.

Emmenegger, et al., "Synthesis of Carbon Nanotubes over Fe Catalyst on Aluminum and Suggested Growth Mechanism," Carbon 2003. vol. 41. pp. 539-547.

Franz, et al., "Carbon Sigle-Wall nanotube Growth in a Volumetrically Confined Arc Discharge System," U.S. Department of Energy Journal of Undergraduate Research. pp. 56-69, publication date unknown.

Hart, et al., "Rapid Growth and Flow-Mediated Nucleation of Millimeter-Scale Aligned Carbon Nanotube Structures from a Thin-Film Catalyst," J of Physical Chemistry B, online Mar. 11, 2006, vol. 110, Iss 6, pp. 8250-8257.

Homma, et al., "Growth of Suspended Carbon Nanotube Networks on 100-nm Scale Silicon Pillars," Applied Physics Letters, Sep. 16, 2002, vol. 81, No. 12, pp. 2261-2263.

Hsu, et al., "Optical Absorption and Thermal Transport of Individual Suspended Carbon Nanotube Bundles," Nano Lett 2009, pp. 590-594, vol. 9, No. 2, American Chemical Society, Publication Date (Web). Jan. 13, 2009.

(56) References Cited

OTHER PUBLICATIONS

Huang, et al., "Growth of Large Periodic Arrays of Carbon Nanotubes." Applied Physics Letters, Jan. 20, 2003, vol. 82, No. 3, pp. 460-463.

Jiang, et al., "Carbon nanotube-coated solid phase microextraction metal fiber based on sol-gel technique," Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the generation of Antimicrobial Characteristics," Journal of Applied Polymer Science 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells," Composite Structures 2006, pp. 571-576. vol. 75, Elsevier Ltd.

Keyvani, "Huge Opportunities for Industry of Nanofibrous Concrete Technology." International Journal of Nanoscience and Nanotechnology, vol. 3, No. 1, Dec. 2007, pp. 1-11.

Kim, et al., "Processing, characterization and modeling of carbon nanotube-reinforced multiscale composites," Composites Science and Technology 2009, pp. 335-342, vol. 69. Elsevier Ltd.

Kim, et al., "Vertical Alignment of Printed Carbon Nanotubes By Multiple Field Emission Cycles," Applied Physics Letters, online Jun. 17, 2004, vol. 84, No. 26, pp. 5350-5352.

Kind, et al., "Patterned Films of Nanotubes Using Microcontact Printing of Catalysts," Adv Mater 1999, pp. 1285-1289, vol. 11, No. 15, Wiley-VCH Verlag GmbH.

Kramer, et al., "Constrained Iron Catalysts for Single-Walled Carbon Nanotube Growth," Langmuir 2005, 21, 8466-8470, <http://pubs.acs.org/dol/abs/10.1021/Ia0506729>.

Laachachi, et al., "A chemical method to graft carbon nanotubes onto a carbon fiber," materials Letters 2008, pp. 394-397, vol. 62, Elsevier B.V.

Lee, "Syntheses and properties of fluorinated carbon materials," Journal of Fluorine Chemistry 2007, pp. 392-403, vol. 128, Elsevier B.V.

Lee, et al., "Fabrication and design of multi-layered radar absorbing structures of MWNT-filled glass/epoxy plain-weave composites," Composite Structures 2006, pp. 397-405, vol. 76, Elsevier Ltd.

Li, et al., "A Miniature glucose/O2 biofuel call with single-walled carbon nanotubes-modified carbon fiber microelectrodes as the substrate," Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites," Nano Lett 2006, pp. 1141-1145, vol. 6, No. 6, American Chemical Society.

Makris, et al., "Carbon Nanotubes Growth and Anchorage to Carbon Fibers," Carbon Nanotubes 2006, pp. 57-58, vol. 222, Springer, the Netherlands.

Mayya, et al., "Diameter Controlled Synthesis of Carbon Nanotubes by CVD Using Sterio-Stabilized Nanoparticle Catalysts", NSTI-Nanotech, 2006, vol. 1, pp. 98-101.

Meyyappan, et al., "Carbon nanotube growth by PECVD: a review," Plasma Sources Sci Technol 2003, pp. 205-216, vol. 12, IOP Publishing Ltd. UK.

Mylvaganam, "Fabrication and Application of Polymer Composites Comprising Carbon Nanotubes," Recent Pat nanotechnol 2007, pp. 59-65, vol. 1, Bentham Science Publishers.

Panhuis, et al., "Carbon Nanotube Mediated Reduction in Optical Activity in Polyaniline Composite Materials," J. Phys Chem C 2008, pp. 1441-1445, vol. 112, American Chemical Society.

Pisco, et al., "Hollow fibers integrated with single walled carbon nanotubes, Bandgap modification and chemical sensing capability," Sensors and Actuators B 2008, 163-170, pp. 129, Elsevier B.V.

Qu, et al., "Carbon Microfibers Sheathed with Aligned Carbon Nanotubes: Towards Multidimensional Multicomponent and Multifunctional Nanomaterials," SMALL, 2006, pp. 1052-1059, vol. 2, No. 8-9.

Rackauskas, "Carbon nanotube growth and use in energy sector," Energetika 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ," Chemical Physical Letters 1999, pp. 158-162, vol. 307, Elsevier Science B.V.

Schmidt, et al., "Thin Solid Films Roll Up into Nanotubes," Nature, Mar. 8, 2001, vol. 410 No. 6825, p. 168.

Singh, et al. "Prodution of Controlled Architectures of Aligned Carbon Nanotubes by an Injection Chemical Vapour Deposition Method," Carbon, online Dec. 7, 2002, vol. 41, Iss 2, pp. 359-368.

Suh, et al., "Highly ordered two-dimensional carbon nanotube arrays," Applied Physics Letters, Oct. 4, 2002, pp. 2047-2049, vol. 75, No. 14. American Institute of Physics.

Thostenson, et al., "Carbon nanotube/carbon fiber hybrid multiscale composites," J Appl Phys 2002, pp. 6034-6037, vol. 91, No. 9, American Institute of Physics.

Wang, et al., "Penetration depth of atmospheric pressure plasma surface modification into multiple layers of polyester fabrics," Surface and Coating Technology 2007. pp. 77-83, vol. 202. Elsevier B.V.

Wang, et al., "Processing and property investigation of single-walled carbon nanotube (SWNT) buckypaper/epoxy resin matrix nanocomposites," Composites, Part A 2004, pp. 1225-1232, vol. 35, Elsevier Ltd.

Wichmann, et al., "Glass-fibre-reinforced composites with enhanced mechanical and electrical properties—Benefits and limitations of a nanoparticle modified matrix," Engineering Fracture Mechanics 2006, pp. 2346-2359, vol. 73, Elsevier Ltd.

Xu, et al., "Bone-shaped Nanomaterials for Nanocomposite Application," Nano Lett 2003, pp. 1135-1139, vol. 3, No. 8, American Chemical Society.

Yabe, et al., "Synthesis of well-aligned carbon nanotubes by radio frequency plasma enhanced CVD method," Diamond and Related Materials 2004, pp. 1292-1295, vol. 13, Elsevier B.V.

Yamamoto, et al., "High-yield growth and morphology control and aligned carbon nanotubes on ceramic fibers for multifunctional enhancement of structural composites," Carbon, Mar. 2009, vol. 47, No. 3, pp. 551-560.

Yanagishita, et al., "Carbon Nanotubes with a Triangular Cross-section, Fabricated Using Anodic Porous Alumina as the Temple," Adv Mater 2004, pp. 429-432, vol. 16, No. 5, Wiley-VCH Vertag GmbH.

Yang, et al., "Electrical Conductivity and Electromagnetic Interference Shielding of Multi-walled Carbon Nanotube Filled Polymer Composites," Mater Res Soc Symp Proc 2005, pp. HH5.3.1-HJH.5.3.5 vol. 858E, Materials Research Society.

Yeh, et al., "Mechanical proporties of phenolic-based nanocomposites reinforced by multi-walled carbon nanotubes and carbon libers," Composites: Part A 2008, pp. 677-684, vol. 39, No. 4.

Zhang et al., "Integration and characterization of aligned carbon nanotubes on metal/silicon substrates and effects of water", Applied Surface Science 225 (2009) 5003-5008.

Zhang, et al., "In situ growth of carbon nanotubes on inorganic fibers with different surface properties," Materials Chemistry and Physics 2008, pp. 317-321, vol. 107, Science direct.

Zhao, et al., "Growth of multi-walled carbon nanotubes with different morphologies on carbon fibers," Carbon 2005, pp. 651-673, vol. 43, Elsevier Ltd.

Zhao, et al., "The growth of multi-walled carbon nanotubes with different morphologies on carbon fibers," Carbon 2550, pp. 651-673, vol. 43, Elsevier Ltd.

Zhong, et al., "Growth Kinetics of 0.5 cm Vertically Aligned Single-Wealled Carbon Nanotubes," The Journal of Physical Chemistry B (Letters), Feb. 6, 2007, pp. 1907-1910, vol. 111, No. 8.

Zhu, et al., "Carbon nanotube growth on carbon fibers," Diamond and Related Materials 2003, p. 1825 vol. 12, Elsevier B.V.

Zhu, et al., "Synthesis of single walled carbon nanotubes by the vertical floating catalyst method," Chinese Science Bulletin 2002, pp. 159-162, vol. 47, No. 2.

Emmenegger, et al., "Carbon Nanotube Synthesized on Metallic Substrate," Applied Surface Science, 2000, pp. 452-456.

Hart, et al., "Desktop Growth of Carbon-Nanotube Monoliths with in Situ Optical Imaging," Small, 2007, pp. 772-777, vol. 3, No. 5.

(56) References Cited

OTHER PUBLICATIONS

Hasegawa, et al., "Millimeter-Tall Single-Walled Carbon Nanotubes Rapidly Growth with and without Water," ACS Nano, 2001. pp. 975-984, vol. 5, No. 2.
Medalia, et al , "Redox Recipes, I. Reaction between Ferrous Iron and Peroxides. General Considerations," Journal of Polymer Science, 1949, pp. 377-398, vol. IV.
Hart, et al., "Growth of conformal single-walled carbon nanotube films from Mo/Fe/$AL_2O_3$ deposited by electron beam evaporation," Carbon (2006) vol. 44, pp. 348-359.
P.D. Bradford, et al., "Electrical Conductivity Study of Carbon Nanotube Yarns, 3-D Hybrid Braids and their Composites," Journal of Composite Materials, 2008, pp. 1533-1545, 42.
E. Garcia, et al., "Aligned Carbon Nanotube Reinforcement of Advanced Composite Ply Interfaces, 49th AIAA/ASME/ASCE/AHS/ASC Structures, Structural Dynamics, and Materials Conference," 2008, pp. 1-10, AIAA 2008-1768.

\* cited by examiner

SYSTEM AND METHOD FOR SURFACE TREATMENT AND BARRIER COATING OF FIBERS FOR IN SITU CNT GROWTH

CROSS-REFERENCE TO RELATED APPLICATIONS

The present application is a continuation of U.S. patent application Ser. No. 12/713,146, filed on Feb. 25, 2010, which claims priority under 35 U.S.C. § 119 to U.S. Provisional Patent Applications 61/157,096, filed on Mar. 3, 2009, and 61/182,153, filed on May 29, 2009, each of which is incorporated by reference herein in its entirety.

STATEMENT REGARDING FEDERALLY SPONSORED RESEARCH OR DEVELOPMENT

Not applicable.

FIELD OF THE INVENTION

The present invention relates to carbon nanotube (CNT) growth, more specifically to CNT growth on fiber substrates.

BACKGROUND OF THE INVENTION

In a fiber-based composite, fibers act as a reinforcing agent, while a matrix material localizes the fibers and, in some cases, controls their orientation. The matrix material also serves as a load-transfer medium between fibers within the composite. Due to their exceptional mechanical properties, carbon nanotubes (CNTs) have been used to further reinforce fiber composite materials. However, incorporation and alignment of CNTs on fibers and/or in composites has been problematic. Current methods of growing carbon nanotubes on fibers result in entangled and non-aligned carbon nanotubes with low weight percentage/concentration of carbon nanotubes. Moreover, some fiber-based substrates are sensitive to the temperatures at which CNTs are grown. This temperature sensitivity can manifest as an inherent instability of the fiber material at CNT growth temperatures. Temperature sensitivity in the CNT growth process can also be the result of CNT nanoparticle catalyst sintering due to nanoparticle mobility on the fiber surface. Improved methods for in situ growth of carbon nanotubes on different fiber-based substrates would be useful in producing greater strength composite materials as well as in other mechanical thermal and electrical applications. The present invention satisfies this need and provides related advantages as well.

SUMMARY OF THE INVENTION

In some aspects, embodiments disclosed herein relate to a system for synthesizing carbon nanotubes (CNT) on a fiber material that includes a surface treatment system adapted to modify the surface of the fiber material to receive a barrier coating upon which carbon nanotubes are to be grown, a barrier coating application system downstream of the surface treatment system adapted to apply the barrier coating to the treated fiber material surface, and a barrier coating curing system downstream of the barrier coating application system for partially curing the applied barrier coating to enhance reception of CNT growth catalyst nanoparticles.

DETAILED DESCRIPTION

Figure 1:
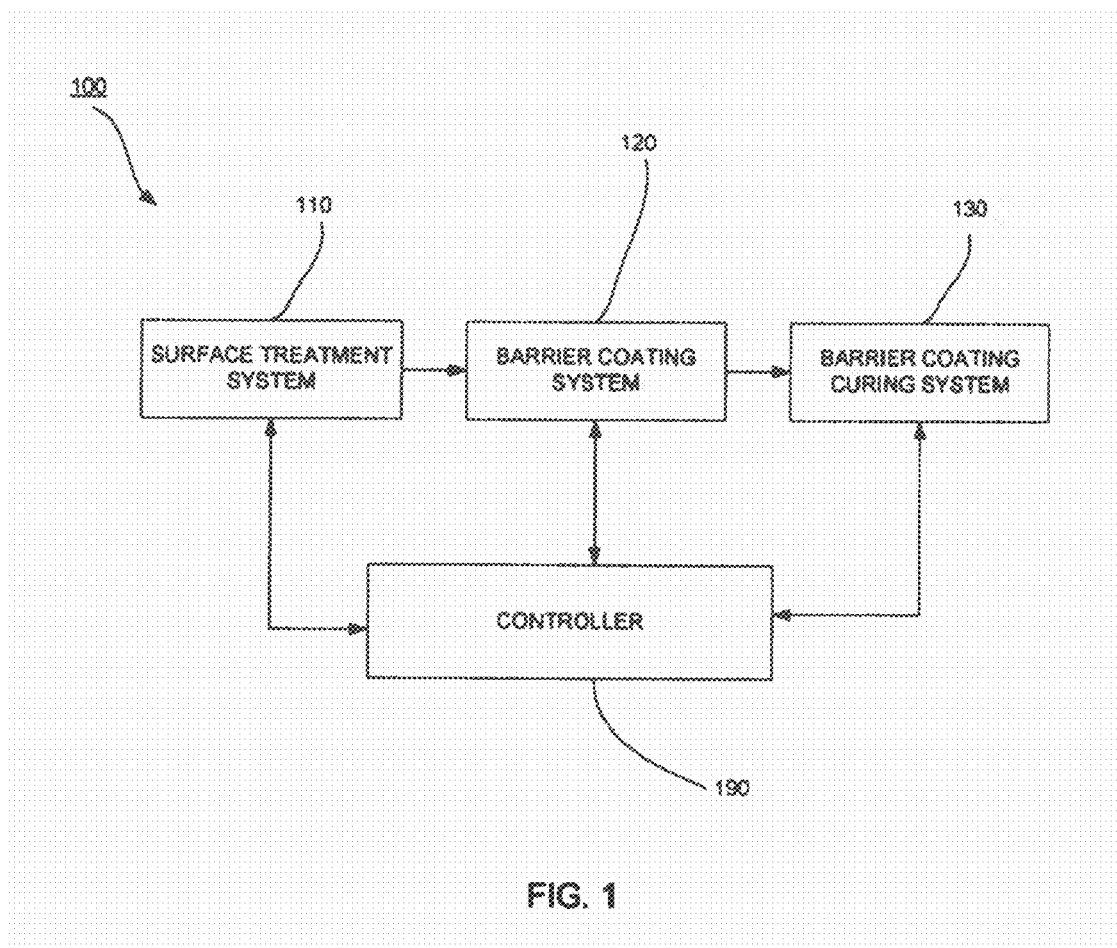
FIG. 1 shows a schematic diagram of a system for preparing a substrate for in situ growth of carbon nanotubes, according to an embodiment of the invention.

The present invention is directed, in part, to methods for the growth of carbon nanotubes on fiber materials, including fiber materials that might otherwise be incompatible with the harsh conditions associated with CNT growth, such as elevated temperatures. The methods of the invention utilize a barrier coating to reduce or prevent nanoparticle sintering and/or to protect temperature sensitive fiber materials from the elevated temperatures associated with CNT growth. The methods of the present invention produce a CNT-infused fiber material that can be incorporated in composite manufacturing to provide composite products with carbon nanotubes at weight percentages exceeding those achieved using loose CRTs, CNTs scaffolds, including other CNT-infused fibers which exhibit lower CNT densities and/or lack control over CNT orientation. Thus, methods of the present invention provide conditions for growth of carbon nanotubes aligned substantially perpendicularly to the axis of the fiber.

The methods of the present invention also prevent poisoning of the CNT nanoparticle catalysts. At high growth temperatures catalyst nanoparticles can react with surfaces of certain fiber material compositions. For example, a fiber material made from carbon or an organic composition can poison catalyst nanoparticles reducing CNT growth. Without being bound by theory, it has been indicated that such substrate-nanoparticle interaction results in overfeeding of the catalyst nanoparticle with carbon radicals. Moreover, diffusion of the surface carbon from a carbon or an organic fiber into the catalyst nanoparticles prior to carbon nanotube nucleation can inhibit CNT growth. In some embodiments, methods employed herein prevent or reduce the interaction of the catalyst nanoparticles with the surface of the fiber material, thereby allowing carbon nanotube growth on the fiber material with increased yield, as well as enhanced alignment of carbon nanotubes on the fiber.

Methods of the present invention also reduce the sintering of nanoparticles on the surface of the fiber material. When heating a CNT nanoparticle catalyst-laden fiber material the catalyst nanoparticles can diffuse on the fiber material surface. Depending on the exact fiber composition, nanoparticle surface mobility can lead to undesirable amounts of nanoparticle sintering leading to reduced CNT growth. This nanoparticle to nanoparticle interaction is reduced by employing the barrier coatings of the present invention.

In some embodiments, the barrier coating employed in methods of the present invention is applied to the fibers in a liquid form and is subsequently cured. The CNT nanoparticle catalysts can be disposed on the fiber substantially simultaneously with the barrier coating, including having the catalyst mixed in with the barrier coating liquid form. In some embodiments, the catalyst can be applied to the fiber after the barrier coating is applied. In such embodiments, the barrier coating can be optionally partially eared prior to CNT nanoparticle catalyst deposition.

By applying the barrier coating in liquid form, the coating thickness can be readily controlled and the nanoparticles can pack densely without any templating effect, as explained further below. Once the barrier coating and nanoparticles catalysts have been applied to the fiber material, the barrier coating can be fully cured "locking" the nanoparticles in place. The catalyst-laden fiber material is ready for carbon nanotube synthesis at this point. This configuration of fiber material, barrier coating, and CNT nanoparticle catalyst provides one or more of the following features: 1) reduction or prevention of nanoparticle sintering; 2) protection of the fiber material by the thermally insulating barrier coating; 3) reduction or prevention of nanoparticle-substrate interaction.

As used herein, the term "conformally depositing," when used in reference to the application of a barrier coating to a substrate, refers to a process in which the barrier coating is deposited on, and in surface contact with a substrate, regardless of substrate geometry. Conformal deposition of a barrier coating on a substrate to which nanoparticles have already been, deposited does not interfere with the exposure of at least a portion of the nanoparticle surface when desired. In such embodiments, the barrier coating can be formulated to fill the voids between nanoparticles without completely encapsulating the nanoparticles. This can be achieved by altering the concentration and/or viscosity of the liquid form of the barrier coating.

As used herein, the term "barrier coating" refers to any coating used to reduce or prevent undesirable nanoparticle-to-nanoparticle interactions such as sintering and agglomeration on a substrate surface. The term also includes coatings used to reduce or prevent undesirable nanoparticle-to-substrate interactions. "Barrier coatings" can be further selected for adherence to particular substrates and/or to protect a substrate from a reactive environment that is used in a reaction in which a nanoparticle is used as a catalyst, seed material, or reactant. Barrier coatings of the invention are thermal insulators that can be applied to a substrate in liquid form, such as gels, suspensions, dispersions, and the like. By providing the barrier coating in a liquid form, it can be subsequently partially or fully cured. The curing process generally involves the application of heat. Exemplary barrier coatings include, for example, spin-on glass or alumina.

As used herein, the term "agglomeration" refers to any process in which nanoparticles disposed on a substrate are fused together. Conditions for agglomeration can include heating to a melting point of the entire nanoparticle or a portion of the nanoparticle, such as its surface. In addition, agglomeration refers to conditions that accelerate surface diffusion of the nanoparticles on the substrate, which includes heating. With respect to the latter conditions, the term "agglomeration" can be used interchangeably with the term "sintering."

As used herein, the term "nanoparticle" or NP (plural NPs), or grammatical equivalents thereof refers to particles sized between about 0.1 to about 100 nanometers in equivalent spherical diameter, although the NPs need not be spherical in shape. Such nanostructured materials encompass any geometry lacking a large aspect ratio with respect to all dimensions.

As used herein, the term "effective diameter" refers to the average nanoparticle diameter of approximately spherical nanoparticles.

As used herein, the term "embedding," when used in reference to nanoparticles in barrier coatings, refers to the process of surrounding the nanoparticles with the liquid form of the barrier coating to any depth, including in surface contact with a substrate, and/or encapsulating the nanoparticle completely. "Embedding" the nanoparticles of the invention in the barrier coating and curing the barrier coating can mechanically lock the particles in place preventing their migration and subsequent agglomeration. "Embedding" the nanoparticles in the barrier coating can include placing the particles in the barrier coating to a depth that the nanoparticles are also in surface contact with the substrate on which the barrier coating is deposited, while still maintaining an exposed surface of the nanoparticle. Nanoparticles can also be "embedded" in the barrier coating by applying the barrier coating after placing nanoparticles on a substrate. Nanoparticles can also be embedded in the barrier coating by simultaneous application of the barrier coating and the nanoparticles.

As used herein, the term "carbon nanotube" or "CNT" refers to any of a number of cylindrically-shaped allotropes of carbon of the fullerene family including single-walled carbon nanotubes (SWNTs), double-walled carbon nanotubes (DWNTS), multi-walled carbon nanotubes (MWNTs). CNTs can be capped by a fullerene-like structure or open-ended. CNTs include those that encapsulate other materials.

As used herein, the term "transition metal" refers to any element or alloy of elements in the d-block of the periodic table. The term "transition metal" also includes salt forms of the base transition metal element such as oxides, carbides, nitrides, acetates, and the like.

As used herein, the term "substrate" refers to any material, the surface of which can be modified by growth of carbon nanotubes employing the methods disclosed herein. Exemplary substrates include fiber materials, such as tapes, yarns, tows, rovings, ribbons, and higher ordered structures such as plies, fabrics, 3D woven and non-woven structures, mats, and the like. Substrates also include flat sheet surfaces such as silicon wafers, graphite sheets, high temperature plastic sheets, and the like.

In some embodiments, the present invention provides a system for synthesizing carbon nanotubes (CNT) on a fiber material that includes 1) a surface treatment system adapted to modify the surface of the fiber material to receive a barrier coating upon which carbon nanotubes are to be grown; 2) a barrier coating application system downstream of the surface treatment system adapted to apply the barrier coating to the treated fiber material surface; and 3) a barrier coating curing system downstream of the barrier coating application system for partially curing the applied barrier coating to enhance reception of a CNT growth catalyst nanoparticles.

The system for CNT synthesis of fiber materials also includes a catalyst application system for depositing CNT growth catalyst nanoparticles. The catalyst nanoparticles can be any d-block transition metal in some embodiments. In some embodiments, the CNT growth catalyst nanoparticles includes iron, iron oxides, and mixtures thereof.

The catalyst application system and barrier coating application system can be configured in several ways. In some embodiments, the two systems are configured for simultaneous deposition of catalyst nanoparticles and barrier coating. In such embodiments, the barrier coating, supplied as a liquid for dip or spray application, can be mixed with catalyst nanoparticles. In other embodiments, the two can be substantially simultaneously supplied by two different spray applicators.

In some embodiments, the catalyst application system is upstream of the barrier coating system. In such embodiments, the catalyst can be applied to the fiber material after plasma treatment or the like. Without being bound by theory, the catalyst nanoparticles can be deposited in the nanoscale pits or wells created by the "roughening" process, as explained herein further below. In this configuration, the barrier coating is applied to the catalyst-laden fiber material and then the barrier coated fiber material is partially cured. It has been indicated that upon partially curing, the nanoparticles are capable of redistribution and can emerge at least some portion of its surface area to make it available for downstream CNT synthesis.

In yet another configuration the catalyst application system is downstream of the barrier coating system. In such embodiments, the catalyst can be applied after partially curing the barrier coating. The partially cured barrier coating provides a "sticky" surface as a conformal coating to capture the deposited nanoparticles and can allow the particle to be embedded to any desirable extent.

The system for CNT synthesis of the invention further includes a CNT growth system that includes a CNT growth chamber equipped with a carbon feedstock supply for chemical vapor deposition (CVD)- or plasma-enhanced CVD-growth of carbon nanotubes. The CNT growth chamber can be a small cavity chamber for efficient utilization of reactive carbon species used in CNT growth. The carbon feedstock can be any type employed in the art, including for example, hydrocarbons, CO, syngas, methanol, acetylene, ethylene, and the like.

Systems of the present invention can be configured for the continuous synthesis of carbon nanotubes on the fiber material. Thus, a fiber material provided in spoolable lengths on a spool or mandrel can be meted out with a payout system upstream of the surface treatment system and, after CNT synthesis, the fiber material can be re-wound downstream of the CNT growth system. In some embodiments, the fiber material coming out of the CNT growth system can be treated in resin bath prior to re-winding.

Referring now to FIG. 1, there is illustrated a schematic diagram of a system 100 for treating the surface of a fiber material, according to an exemplary embodiment of the invention. In the illustrated embodiment, system 100 includes a surface treatment system 110, a barrier coating system 120, and a barrier coating curing system 130. A controller 190 in communication with systems 110, 120 and 130 operates to monitor and/or control various system parameters and processes for preparing the fiber material for carbon nanotube growth on its surface.

Surface treatment system 110 receives a fiber material from an upstream substrate source (not shown). In one configuration, surface treatment system 110 receives a carbon fiber, for example, although any fiber type can be used such as metal fiber, organic fiber, such as an aramid, ceramic fiber, or glass fiber. In this exemplary embodiment, the feed rate of the carbon fiber from the source is controlled by controller 190. Surface treatment system 110 is adapted to alter the surface chemistry of the fiber to improve at least one of the wetting and adhesion properties of the fiber material surface. The improvement in the wetting and adhesion properties of the fiber material surface renders the fiber surface more receptive and retentive of a barrier coating.

Figure 4:
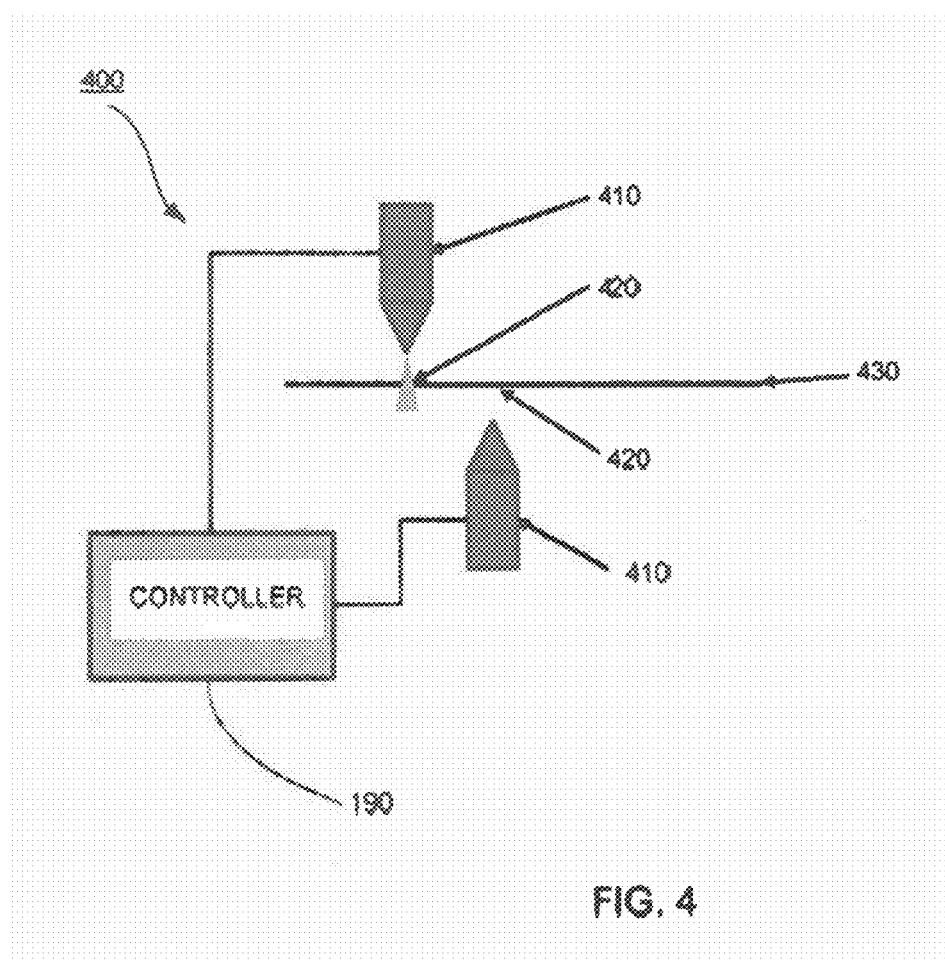
FIG. 4 shows a schematic diagram of an embodiment of a cold plasma treatment system.

In an exemplary embodiment, surface treatment of the fiber surface in surface treatment system 110 includes cold plasma treatment of the fiber. Referring now to FIG. 4, in one configuration, surface treatment system 110 takes the form of a corona discharge based plasma treatment system 400. By way of example only, fiber 430 passes at a given rate through system 400 plasma treatment enclosure (for example, about four (4) feet/min). Fiber 430 passing through system 400 enclosure is exposed to a mixture of a primary gas and a secondary gas. The feed rate of the gas mixture to the system and other variables may be controlled by controller 190. The function of the primary gas is to ignite or create a plasma when subjected to corona discharge. As is known in the art, a corona discharge is an electric discharge resulting from an ionization of a fluid surrounding a conductor, through which an electric current flows, creating a potential gradient exceeding a certain threshold value. The primary gas is ionized to create a plasma when an electric current flows through a conductor immersed in the gas mixture. The function of the secondary gas is to react with the fiber surface to enhance at least one of the wetting and the adhesion properties of the fiber surface. Without being bound by theory, the plasma treatment provides a "roughened" surface creating nano-scale features such as valley in the fiber material surface. The plasma can also create functional group handles that can enhance bonding between the fiber material and the barrier coating. Fiber 430 is subjected to the "exhaust" stream of the plasma 420 from plasma heads 410. Controller 190 controls the rate of plasma discharge from plasma heads 410. Examples of primary gases include helium and argon. An example of a secondary gas is oxygen. The choice of secondary gas can depend on the type of fiber material being treated. For example, oxygen is a useful secondary gas for treatment of a carbon fiber.

By way of example only, a gas mixture can include about thirty (30) liters of primary gas and about 0.3 liter of secondary gas. The fiber is subjected to the gas mixture at a flow rate of about 30.3 liters of the aforementioned gas mixture per minute in the presence of an electric field. Oxygen in the gas mixture can react with carbon bonds on the fiber surface to form various organic functional groups such as carboxyl groups and carbonyl compounds, the latter including organic functional groups such as ketones and aldehydes, for example. Without, being bound by theory, it has been indicated that oxygen also tends to remove some carbon atoms from the surface to create further reactive carbon atoms in the network of a carbon fiber material surface. The carboxyl and carbonyl compounds thus formed on the fiber surface have a higher tendency to accept a barrier coating as compared to an untreated carbon fiber surface. This improved adhesion of the barrier coating be the result of non-bonding interactions such as hydrogen bond acceptors and donors associated with the surfact functional groups formed by the plasma. In this manner the fiber surface is prepared for the application of a barrier coating thereon.

Figure 5:
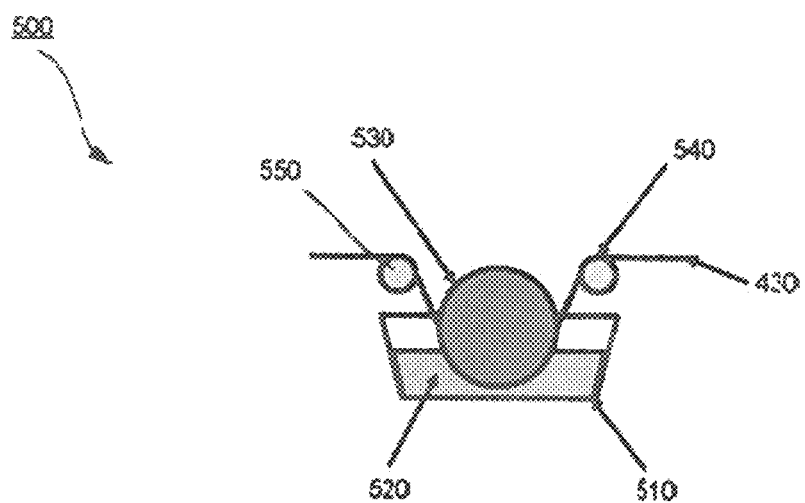
FIG. 5 shows a schematic diagram of an embodiment of a wet surface treatment system.

Referring now to FIG. 5, in another exemplary embodiment, surface treatment of the fiber in system 110 includes a wet coating treatment system 500. System 500 receives fiber 430 from an upstream fiber source. Fiber 430 is immersed in a chemical solution 520 in a container in a bath 510 to treat the surface of fiber 430. Fiber 430 is guided by two guide rollers 540, 550. A bath roller 530 immerses fiber 430 into solution 520. In one configuration the chemical solution includes about 1% (by volume) solute such as dimethylisopropylsilane, methylcyclosiloxane, polysiloxanes, polydimethylsiloxane, polydiphenylsiloxane, polycarbosilanes, alumoxane, methylsiloxane, silane, and/or alkoxysilanes in a solvent such as water. Oxysilanes reacts with the surface of fiber 430 thereby forming compounds thereon which are more receptive of a barrier coating. At least two different sets of functional groups are formed on the surface. The first set of functional groups bonds well with the fiber whereas the second set of function group bonds well with the barrier coating. These compounds collectively tend to adhere to the fiber surface and to a barrier coating, thereby enhancing the adhesion between the fiber surface and the barrier coating. After the surface treatment, fiber 430 exits the treatment system 500 and enters the downstream barrier coating system 120. Barrier coating system 120 operates to apply a barrier coating on the treated fiber material surface. In an exemplary embodiment, a barrier coating is applied in thicknesses ranging from about 10 nanometers (nm) to about 100 nanometers (nm). The type of barrier coating depends on the fibers and the catalyst chemistries. A barrier coating material is selected so as to protect the fiber from interaction with the catalyst particles, in an exemplary embodiment, a coating for a carbon fiber includes an alumina coaling such as alumoxane, alumina nanoparticles, or other alumina coating solutions. In another embodiment, a coating for a carbon fiber includes a glass coating, such as spin on glass, glass nanoparticles or other glass coating solutions such as methyl siloxane based solutions. Such boundary coatings or barrier coatings can also be used on other substrates such as glass fibers. KEVLAR® (a type of aramid fiber), as well as other organic fibers. For example, alumoxane may be used on KEVLAR® to protect it from high temperatures encountered in the carbon nanotubes growth processes. One of the criteria for the selection of the barrier coating material is how well it adheres to a given fiber material surface. Another of the criteria is the degree to which the coating mitigates the interaction of carbon nanotube growth catalyst nanoparticles with the fiber surface.

In an exemplary embodiment of the invention, barrier coating system 120 includes a dip coating system. The dip coating system can be similar to the system 500 shown in FIG. 5. System 500 receives a surface treated fiber 430 from upstream surface treatment system 110. In one configuration, a solution containing about 1 part (by volume) methylsiloxane based solution in about 120 parts solvent such as isopropyl alcohol is used. Fiber material 430, for example, a carbon fiber, is fed at the given rate (for example, about 4 feet/minute) into the solution for a given duration $t_d$ of about 15 seconds. The barrier coating thus applied on the surface of fiber material 430 has a thickness in the range of about 10 nm to about 100 am, in some embodiments, and in the range of about 10 nm to about 20 nm, in other embodiments. The dipping time or residence time of the fiber material in the solution can be adjusted to obtain a uniform barrier coating on the fiber surface. The residence time can also be varied to account for different types of fibers and their corresponding barrier coating materials. The thickness of the resulting barrier coating is a function of the concentration of the coating solution and thus can be varied by adjusting the concentration of coating solution 520. Other coating materials include alumina-based coatings such as alumoxane, alumina nanoparticles, and glass-based coatings such as spin on glass and glass nanoparticles. After the application of the barrier coating, the fiber is then supplied to downstream barrier coating curing system 130.

Figure 6:
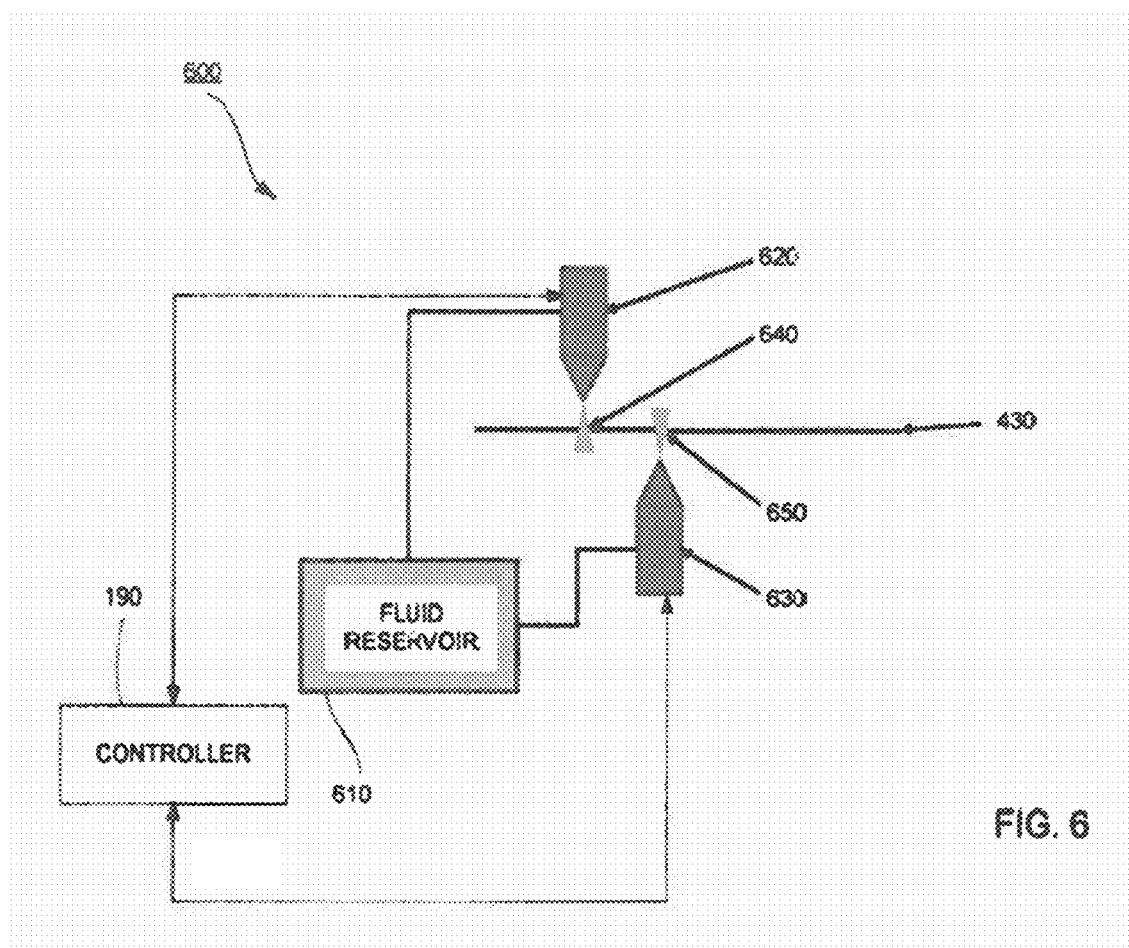
FIG. 6 shows a schematic diagram of an embodiment of a spray barrier coating application system.

Referring now to FIG. 6, in another exemplary embodiment, barrier coating system 120 includes a spray coating system 600. Coating system 600 receives surface treated fiber 430 from treatment system 110. The methyl siloxane-isopropyl alcohol-solution from fluid reservoir 610, described herein above may be used to apply, via one or more spray nozzles 630, the barrier coating onto the surface of fiber 430. Solution 650 is sprayed uniformly onto fiber 430. The fiber feed rate, nozzle orientation and spray rate and pressure can be controlled via controller 190. Once a harrier coating of sufficient thickness is sprayed onto the surface of fiber 430, fiber 430 is supplied to downstream barrier coating curing system 130. Barrier coating curing system 130 is operative to partially cure the barrier coating to create a pseudo-cured state of the barrier coating. System 130 receives the treated fiber that has passed through the barrier coating application station 120. At this time, the newly applied barrier coating can lack sufficient structural rigidity to remain permanently adhered to the fiber surface because the transformation of the barrier coating to a monolithic solid coating is not yet complete. System 130 operates to partially cure the fiber barrier coating to increase its structural rigidity to accept and retain the CNT catalyst nanoparticles and ensure that the barrier coating remains adhered to the fiber surface. In some embodiments, the CNT catalyst nanoparticles can be applied prior to partially curing and in some such embodiments, the CNT catalyst nanoparticles can be applied substantially simultaneously with application of the barrier coating, including mixing the catalyst nanoparticles in the barrier coating solution.

In one configuration, system 130 includes a heat chamber that subjects the fiber to a temperature of about 250° C. in a locally purged atmosphere. In an exemplary embodiment, nitrogen ($N_2$) gas may be used to create the locally purged atmosphere which mitigates any atmospheric contamination of the freshly applied barrier coating on the fiber material surface. The fiber material passes through system 130 at a given rate (for example, about four (4) foot/sec). The partial curing of fiber with the barrier coating creates a pseudo-cured state, or a gel-like state, of the barrier coating, which becomes sufficiently rigid to remain adhered to the fiber surface while remaining receptive to catalyst nanoparticles which can be applied thereafter, although as explained above, the catalyst can be applied substantially simultaneously with the harrier coating.

After the application of the barrier coating, the fiber is then supplied to a catalyst coating system for the application of the catalyst nanoparticles on the fiber material. The catalyst panicles can be applied on the treated fiber using wet dipping or chemical bath methods. The applied catalyst nanoparticles adhere to the pseudo-cured barrier coating. In the case of simultaneous deposition with the barrier coating, the catalyst nanoparticles are disposed throughout the harrier coating layer.

In some embodiments, the barrier coated fibers are passed through a growth chamber for the synthesis of carbon nanotubes and the relatively high temperature completely cures the barrier coating on the fiber surface. In some embodiments, fully curing the barrier coaling eau be performed separately from the CNT growth chamber. During CNT growth, the catalyst nanoparticles become more reactive at the relatively high temperatures and embed themselves in the barrier coating which is simultaneously cured completely. At the same time, CNT formation can occur as the catalyst nanoparticles embedded in the barrier coating initiate the nucleation of CNTs when subjected to a cracked carbon feed gas under appropriate conditions. For example, the temperatures in the growth chamber may be about 500° C. or higher. The barrier coating thus protects the fiber surface by mitigating detrimental fiber surface to catalyst nanoparticle interaction which can result in catalyst poisoning while facilitating in situ growth of carbon nanotubes on the carbon fibers. The barrier coating can also prevent migration and sintering of the nanoparticles on the fiber material surface.

It is understood that controller 190 can be adapted to independently sense, monitor and control system parameters including one or more of substrate feed rate, plasma gas mixture feed rate, and curing temperature. Controller 100 can be an integrated, automated computerized system controller that receives parameter data and. performs various automated adjustments of control parameters or a manual control arrangement.

Figure 2:
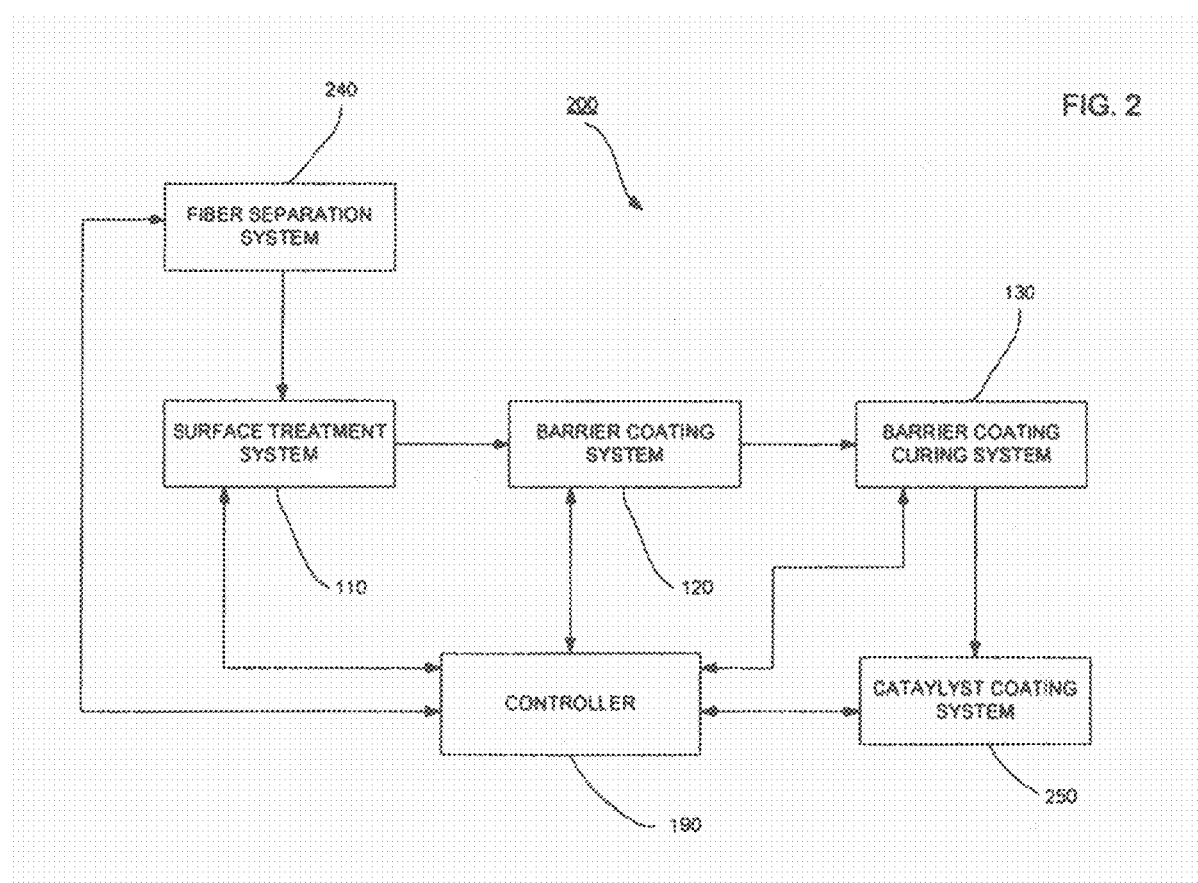
FIG. 2 shows a schematic diagram of a system for preparing a fiber tow for in situ growth of carbon nanotubes, according to an embodiment of the invention.

Referring now to FIG. 2, a schematic diagram of a system 200 for treating the surface of a substrate, according to another exemplary embodiment of the invention is illustrated. In the Illustrated embodiment, system 200 includes a fiber separation system 240, surface treatment system 110, barrier coating system 120, a barrier coating curing system 130, and a catalyst coating system 250. When a bundle of fibers, such as a tow (or roving or yarn), is to be treated, fiber separation system 240 is used to spread the fibers. Exemplary tows can include between about 1000 to about 12000 fibers. In an exemplary embodiment, a tow is spread and planarized using a positive air pressure. In another embodiment, the tow is spread and planarized using a negative air pressure, such as a vacuum or partial vacuum. In an exemplary embodiment, fiber separation system 240 is an air knife. As is known in the art, an air knife is a pressurized air plenum containing a series of holes or continuous slots through which pressurized air exits in a laminar flow pattern. In other embodiments, other known techniques and devices may be used to spread or separate the fibers of the fiber tow.

Once the fibers are spread or separated, they are fed downstream to the surface treatment system 110, barrier coating system 120, and barrier coating curing system 130 as described herein above. The fiber with barrier coating is then supplied to downstream catalyst coating system 250. In one configuration, catalyst coating system 250 is a colloidal nanoparticle solution of the catalyst particles such as iron oxide or nickel oxide. The fiber with harrier coating is immersed in the solution where the catalyst particles embed in the pseudo-cured barrier coating. The catalyst coated fiber is then introduced into a growth chamber at an appropriate temperature along with appropriate carbon feed gas. Free carbon radicals resulting from the dissociation of the carbon feed gas initiate the growth of carbon nanotubes in the presence of the catalyst nanoparticles on the fiber material surface.

Figure 3:
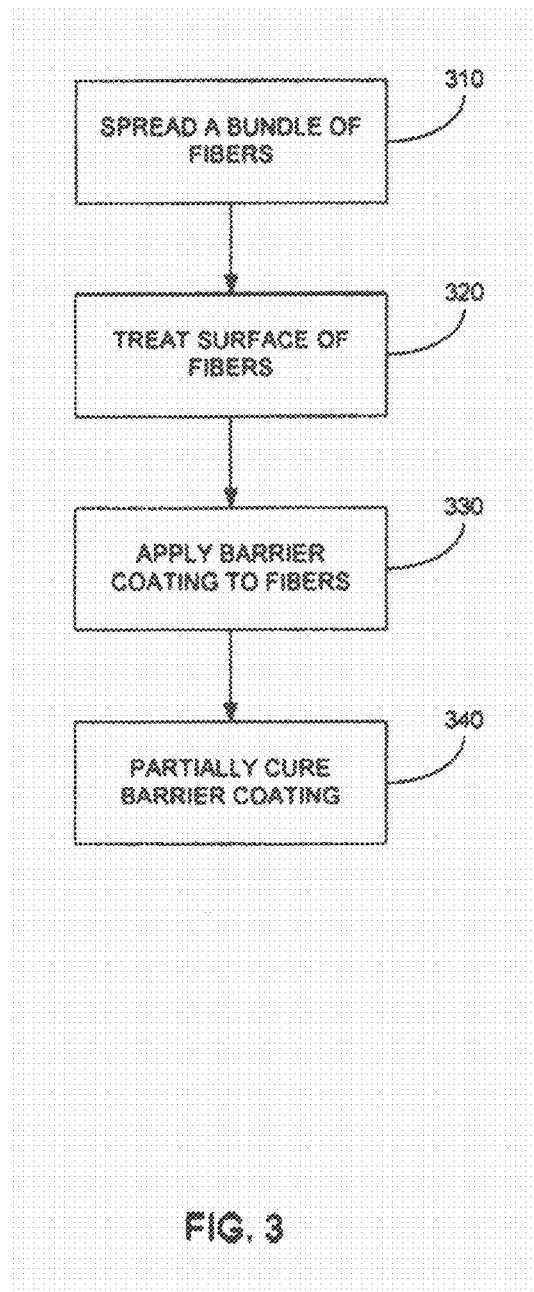
FIG. 3 shows a process flow for treating a fiber surface to promote adhesion with a barrier coating and for applying a barrier coating and catalyst particles, according to an aspect of the invention.

Referring now to FIG. 3, there is illustrated a process flow for preparing a bundle of fibers, such as fiber tow, for the growth of carbon nanotubes, according to some embodiments of the invention. At block 310, a fiber bundle, or a tow, is spread to facilitate surface treatment of the fibers by exposing the fiber surface area. At block 320, the fibers are subjected to a surface treatment process to prepare the surfaces of the fibers for application of the barrier coating. The surface treatment process alters the surface chemistry of the fibers to improve at least one of the wetting and adhesion properties to the barrier coating. At block 330, the barrier coating is applied to the fibers. The barrier coating protects the fibers and mitigates the interaction between the catalyst particles and the fiber surfaces, which interaction is detrimental to the growth of carbon nanotubes. The barrier coating protects the fibers from high temperature oxidation and degradation as well. At block 340, the barrier coating is partially cured to create a pseudo-cured state of the barrier coating. In the pseudo-cured state of the barrier coating, the catalyst particles are embedded in the barrier coating.

Figure 10:
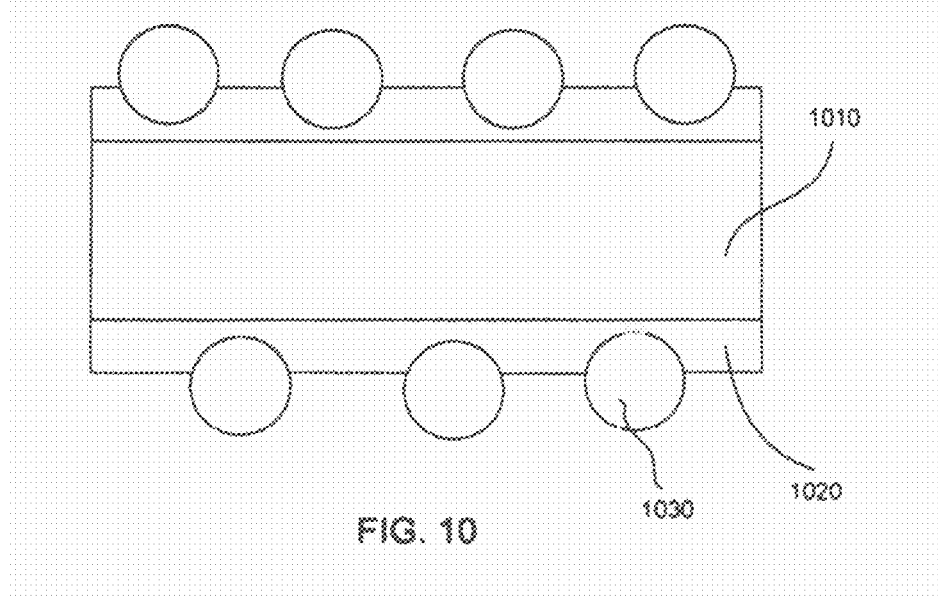
FIG. 10 shows a cross-sectional view of a substrate treated by the system of FIG. 2, according to another embodiment of the invention.

Referring now to FIG. 10, there is illustrated schematically a cross-sectional view of an exemplary substrate 1010 resulting from the process of FIG. 3. A barrier coating 1020 is applied to a fiber material substrate 1010. Subsequent application of catalyst nanoparticles to the barrier coating coated substrate 1010 results in catalyst nanoparticles embedded in barrier coating 1020. Barrier coating 1020 serves to minimize interaction between catalyst nanoparticles 1030 and substrate 1010 and between catalyst nanoparticles with each other.

Figure 7:
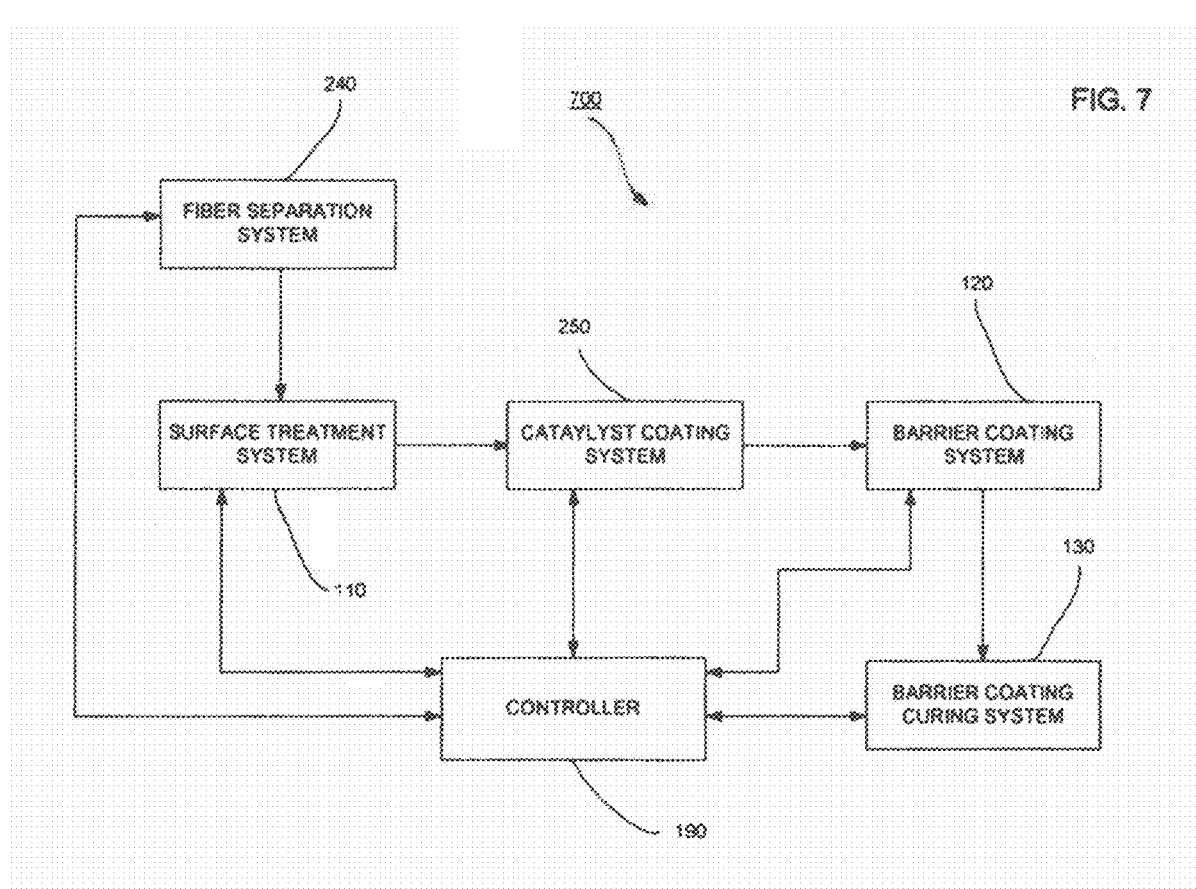
FIG. 7 shows a schematic diagram of a system for preparing a fiber tow for in situ growth of carbon nanotubes, according to another embodiment of the invention.

Referring now to FIG. 7, there is shown a schematic diagram of a system 700 for treating the surface of a substrate, according to yet another exemplary embodiment of the invention. Components of system 700 are similar to the components of system 300 as shown in FIG. 2. In system 200, the catalyst nanoparticles are applied to the fibers after a barrier coating has been applied to the fibers and has been partially cured. In contrast, in system 700, the catalyst particles are applied to surface treated fibers arriving from surface treatment system 110. After the catalyst particles are applied to the fiber surface, the fibers are supplied to the barrier coating system 120 for an application of a barrier coating and subsequently to barrier coating curing system 130 for curing the barrier coating.

Fibers are surface treated in surface treatment system 110 using techniques such as plasma treatment and wet chemical etching. The surface treated fibers are thus rendered receptive to and retentive of the catalyst nanoparticles. The surface treated fibers are then supplied to catalyst application system 250 wherein the catalyst particles are applied to fiber surfaces. The catalyst particles are chemically and/or mechanically bonded to the fiber surface. It has been indicated that the surface treatment of the fibers creates a favorable morphology including nanoscale features such as pits and grooves that allows for mechanical interlocking of the catalyst particles with the fiber surface as well as for adhesion of the barrier costing to the fiber surface. It has further been indicated that chemical bonding between the catalyst particles and the curing barrier coating occurs as a result of covalent and/or pi-pi interactions formed therebetween.

Figure 8:
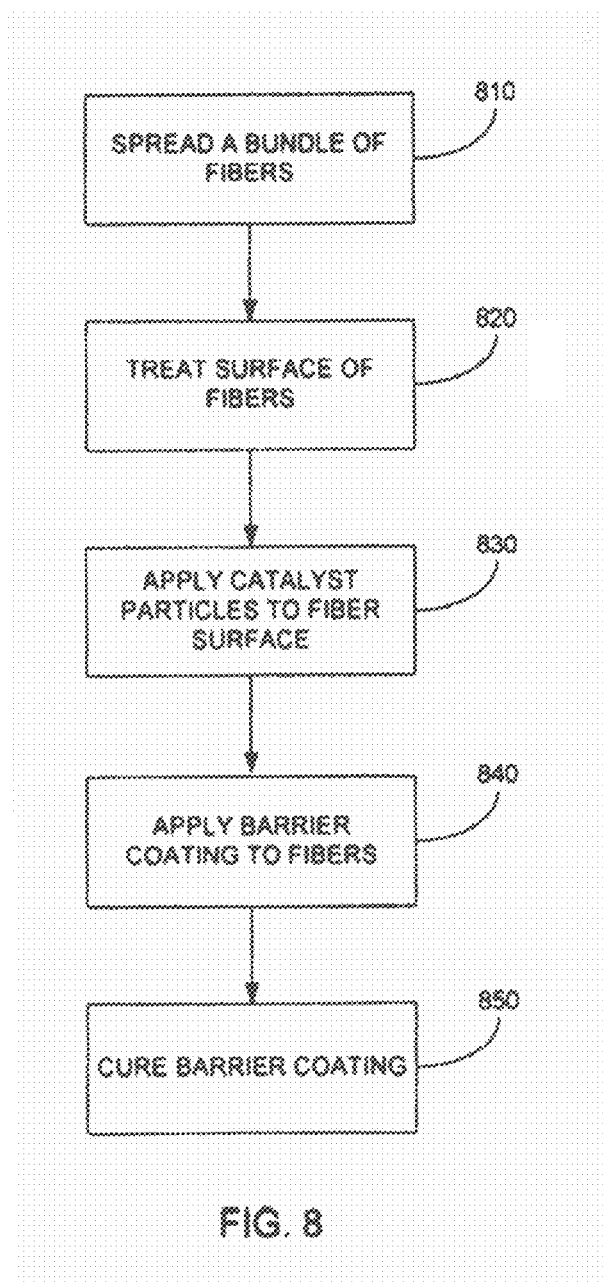
FIG. 8 shows a process flow for treating a fiber surface to promote adhesion with a barrier coating and for applying catalyst particles and a barrier coating, according to another aspect of the invention.

Now referring to FIG. 8, there is illustrated a process flow for preparing a bundle of fibers (i.e. a fiber tow) for growth of carbon nanotubes, according to another aspect of the invention. At block 810, a fiber bundle, or a tow, is spread to facilitate the surface treatment of the fibers by exposing the fiber surface area. At block 820, the fibers are subjected to a surface treatment process to prepare the surfaces of the fibers for application of the barrier coating. The surface treatment process alters the surface chemistry of the fibers to improve at least one of the wetting and adhesion properties to the barrier coating. At block 830, the catalyst particles are applied to the surface treated fibers. The catalyst particles are mechanically and/or chemically bonded to the fiber surface.

At block 840, the barrier coating is applied to the fibers. The barrier coating protects the fibers and mitigates the interaction between the catalyst particles and the fiber surfaces, which interaction is detrimental to the growth of carbon nanotubes. The barrier coating protects the fibers from high temperature oxidation and degradation as well. At block 840, the barrier coating is at least partially cured to create a pseudo-cured state of the barrier coating. While the harrier coating is being at least partially cured, the catalyst nanoparticles applied to the fiber surface can, in some embodiments, emerge through the barrier coating. The catalyst nanoparticles so emerged from the barrier coating provide nucleation sites for the carbon nanotubes synthesis, when the fiber material is introduced in a CNT growth chamber. The barrier coating also acts to anchor the catalyst annoparticles to the fiber surface while mitigating chemical interaction of the fiber surface with the catalyst particles.

Figure 9:
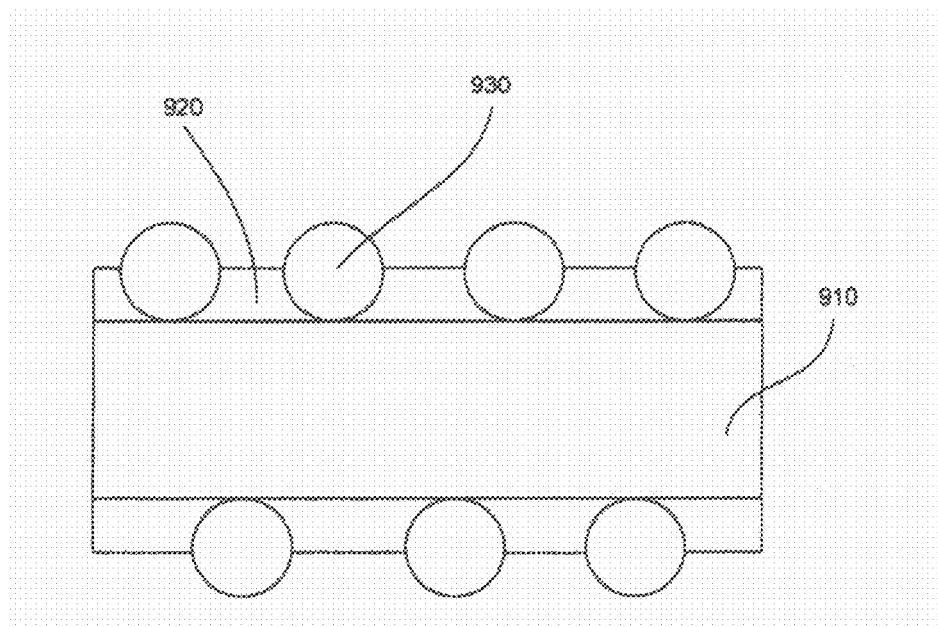
FIG. 9 shows a cross-sectional view of a substrate treated by the system of FIG. 7, according to an embodiment of the invention.

Referring now to FIG. 9, there is illustrated schematically a cross-sectional view of an exemplary substrate 910 resulting from the process of FIG. 8. Catalyst particles 930 are applied to substrate 910. Subsequently, a barrier coating 920 is applied to substrate 1010. As barrier coating 920 is at least partially cured, catalyst particles 930 emerge through barrier coating 920 to provide nucleation sites of carbon nanotubes. Barrier coating 1020 serves to minimize interactions between catalyst particles 1030 and substrate 1010, thereby mitigating poisoning of catalyst particles 930. Barrier coating 1020 also serves to minimize interactions between catalyst particles 1030 with themselves.

Regardless of the sequence of the catalyst application and the barrier coating application steps, the fiber material is coated with a barrier coating interspersed with catalyst nanoparticles. The catalyst nanoparticles can protrude from the barrier coating and provide nucleation sites for carbon nanotube synthesis, When such a substrate is introduced into a growth chamber and subjected to high temperatures employed in carbon nanotube synthesis, the barrier coating effectively reduces the exposure of the substrate surface to high temperatures. This reduced exposure, in turn, mitigates undesired chemical reactions of the substrate surface with the catalyst particles, thereby reducing poisoning of the catalyst particles. The reduction in the catalyst poisoning enhances the CNT yields during the CNT synthesis in the growth chamber.

The methods and systems of the present invention can produce carbon nanotubes in a greater weight percentage on the fibers than conventional methods for CNT growth on fibers, for example, current methods which alter the catalyst chemistry achieve a very low yield of fiber on the surface, for example, no more than about 0.5% to about 1.0% of the composite mass. The methods described herein achieve a typical yield of greater than about 3% to about 5% and in certain cases up to about 20% of the composite mass, in a resin matrix. However, the methods of the invention can also be purposefully employed for lower loadings. Thus, for example, a loading as low as about 0.1% can be achieved. In some embodiments, the weight percent range of infused CNTs on a fiber can be between about 0.1 to about 20%, including 1%, 2%, 3%, 4%, 5%, 634, 7%. 8%, 9%, 10%, 11%, 12%, 13%, 14%, 15%, 16%, 17%, 18%, 19%, and 20%, and any fraction in between.

Methods of the present invention provide carbon nanotubes on substrates that are well-aligned and are perpendicular to the substrate. The CNTs grown on the nanotubes can be of sufficient density and/or length that they entangle and/or such that they may share a common CNT wall. In other embodiments, the CNTs can be grown perpendicular to the substrate and parallel, but do not share any CNT walls. Increased carbon nanotube to fiber adhesion in CNT infused products translates to improved transfer load through the interface of the carbon nanotubes and the substrate surface.

The present disclosure is also directed, in part, to methods that employ barrier coatings on any substrate, including fiber-based substrates, to "lock" nanoparticles distributed on a substrate or fiber surface in place to substantially reduce nanoparticle sintering and agglomeration at high temperatures. The barrier coatings employed in the methods disclosed herein are in contact with the nanoparticles. In some embodiments, the barrier coating does not fully encapsulate the nanoparticles, allowing the nanoparticles to be exposed to desired reaction environments while preventing nanoparticle sintering and agglomeration. In some embodiments, the barrier coating does fully encapsulate the nanoparticles. In such applications, the function of the nanoparticle can be, for example, as a means of absorbing high energy radiation. The heat associated with such absorption can be sufficient to cause nanoparticle sintering in the absence of the barrier coating. The barrier coating and nanoparticles can be disposed on the substrate surface sequentially in any order or they can be applied to the substrate simultaneously.

The barrier coatings employed in methods disclosed herein can be provided as a sufficiently thin layer (equal to or less than the effective nanoparticle diameter) that the barrier coating itself does not influence the reactivity profile and/or course of the reactions catalyzed or seeded by the nanoparticles. For example, when using CNT growth catalysts embedded in nanochanneled template materials for aligned CNT growth, the template dictates the CNT dimensions, including width, and direction of CNT growth (Li et al. App. Phys. Lett. 75(3):367-369(1999)).

In some embodiments, the barrier coating can completely embed the nanoparticles. In some embodiments, a barrier coating can embed the nanoparticles while also allowing a degree of diffusion through the barrier coating to allow access to the embedded nanoparticles. Methods of the invention embed nanoparticles in the barrier coating in a dense array without the restrictions of any kind of pre-formed template. This can provide a greater nanoparticle density, as well as a more uniform density of nanoparticles. These benefits are realized by providing the barrier coating in a liquid form which allows the barrier coating to conform to the nanoparticle dimensions. This is particularly beneficial in CNT synthesis applications because sintering is prevented and CNT morphology is controlled by the nanoparticle itself, rather than a pre-determined channel in which the CNT resides.

Figure 11:
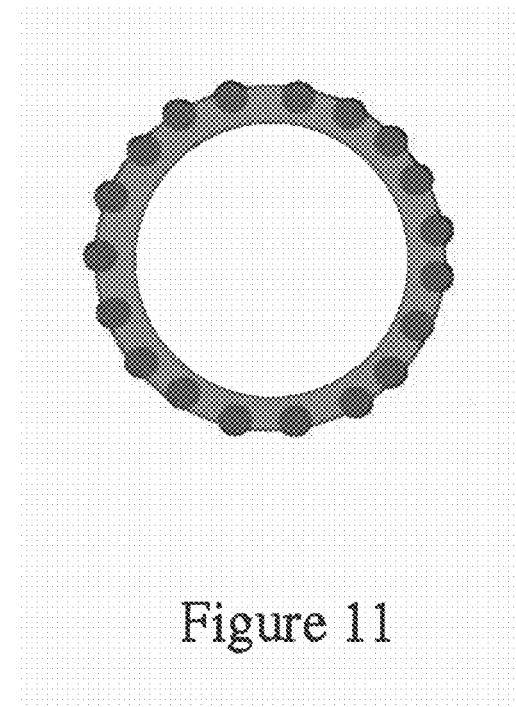
FIG. 11 shows nanoparticles embedded in a barrier coating disposed conformally over a substrate.

The barrier coatings employed in methods disclosed herein provide a means to prevent sintering and agglomeration of nanoparticles under high mobility conditions by preventing nanoparticle-to-nanoparticle interactions. The barrier coatings can also prevent nanoparticle-to-substrate interactions by means of physical separation and mechanical interlocking of the nanoparticles in the barrier coating, as exemplified in FIG. 11. For example, a metallic nanoparticle can form an alloy with a metal substrate. The barrier coating can prevent such alloy formation. Similarly, in the area of CNT growth, the barrier coating can prevent nanoparticle-to-substrate interactions between a transition metal catalyst and a carbon rich substrate. Such nanoparticle-to-substrate interaction can poison the transition metal nanoparticle catalyst by providing an excessive amount of carbon as feedstock under CNT growth conditions. More generally, the barrier coatings employed in methods disclosed herein facilitate the use of nanoparticles with substrates that would otherwise be incompatible in the absence of the barrier coating.

Figure 12:
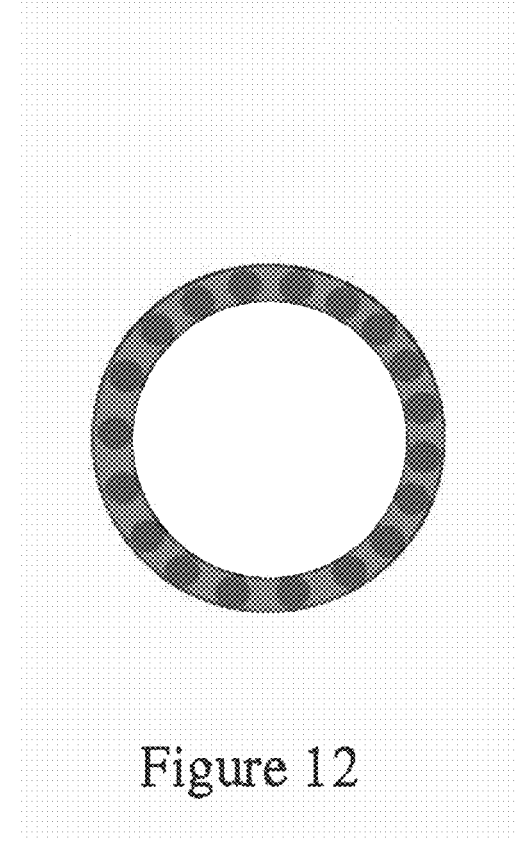
FIG. 12 shows nanoparticles embedded in a barrier coating and in surface contact with a substrate.

In some embodiments, the embedded nanoparticles can be in surface contact with the substrate as shown in FIG. 12 while still avoiding or reducing nanoparticle-to-substrate interactions. For example, the barrier coating can be used to minimize the contact area between the substrate and the nanoparticles. In some embodiments, even where there is still appreciable contact area between the nanoparticles and the substrate, a sufficiently thick barrier coating can provide a thermal barrier so that the nanoparticle-substrate contact interface is at a sufficiently low temperature to avoid any deleterious interactions. In some embodiments, when the nanoparticle is in contact with a substrate surface, a barrier coating thickness can be used that encapsulates the nanoparticle while still allowing diffusion of reactive materials through the barrier coating to allow nanoparticle catalyzed reactions to take place. For example, in the case of CVD CNT growth, carbon atoms from a CVD carbon feedstock can diffuse through an appropriate barrier coating material. In such embodiments, it can be desirable to have a barrier coating thickness that is approximately the same or just slightly more than the effective diameter of the nanoparticle catalysts.

An additional use of the barrier coating can be to protect sensitive substrates from high temperature and/or reactive environments used in connection with reactions of the embedded nanoparticles. For example, some carbon-based substrates may not be stable under high reaction temperatures or when exposed, to a variety of reaction conditions, such as a strongly oxidative environment.

Figure 13:
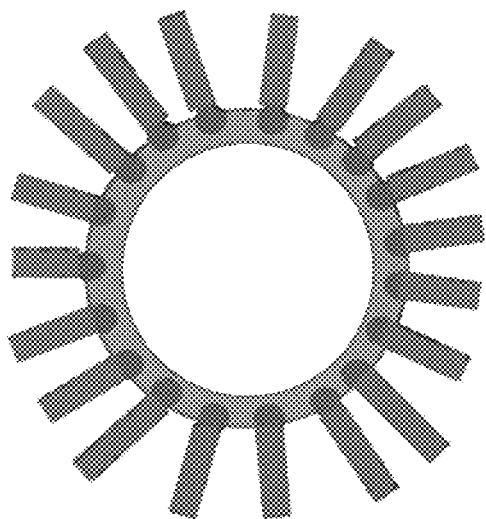
FIG. 13 shows exemplary growth of carbon nanotubes on the embedded nanoparticles shown in FIG. 11.

The present invention is also directed, in part, to articles that include a substrate having a barrier coating conformally disposed on at least one surface of the substrate with a plurality of nanoparticles embedded in the barrier coating. Such articles can be used in further reactions to modify the substrate and hence properties of the article. For example, CNTs can be grown on the surface of the substrate, as exemplified in FIG. 13, when employing transition metal nanoparticles. Such CNTs can be useful in the manufacture of organized CNT arrays for use in surface enhanced Raman applications and microelectronic structures. In the preparation of reinforcing materials in composites and other composite applications such as EMI shielding, signature control, and lightning strike protection. Articles of the invention can also include barrier coated substrates with embedded nanoparticles in which the nanoparticles serve as catalysts for other reactions where high temperatures are employed, but in which the article remains unchanged. For example, articles can include immobilized catalyst nanoparticles for combustion reactions, as might be employed in a catalytic converter.

In some embodiments, the present invention provides a method that includes (a) conformally depositing a barrier coating on at least one surface of a substrate; the barrier coating is provided in liquid form; (b) embedding a plurality of nanoparticles in the barrier coating to a selected depth creating an embedded portion of each of the plurality of nanoparticles; and (c) frilly curing the barrier coating after embedding the plurality of nanoparticles. The embedded portions of each of the plurality of nanoparticles are in continuous contact with the cured barrier coating. The barrier coating does not affect the arrangement of the plurality of nanoparticles embedded therein. Thus, the barrier coating does not behave as a template dictating the relative placement of the nanoparticles. The result of this process is a barrier-coated substrate with locked nanoparticles that can be used is a variety of contexts depending on the exact choice of nanoparticle and substrate employed, as further described below. In some embodiments, the step of conformally depositing the barrier coating and embedding the plurality of nanoparticles is simultaneous. Thus, the barrier coating material can also be applied to the substrate in situ with the nanoparticles via solutions that contain both the barrier coating and nanoparticle material ('hybrid solutions').

In some embodiments, the methods described herein control particle dispersion on a variety of shaped objects. This includes an efficient means of coating composite, materials like fibers or fabrics and irregular shaped materials. Moreover, methods of the invention control and maintain a nanoparticle density on substrate surfaces, even when exposed to conditions that might cause NP diffusion and/or sintering.

In some embodiments, the present invention provides a method that includes (a) conformally depositing a barrier coating on at least one surface of a substrate and (b) embedding a plurality of nanoparticles in the barrier coating, wherein the thickness of the barrier coating is about the same or greater than the effective diameter of the plurality of nanoparticles. In such embodiments, the thickness of the barrier coating can be between about equal to the effective diameter of the plurality of nanoparticles up to about 5,000% greater than tins effective diameter. Thus, the thickness of the barrier coating can be 0.01% greater than this diameter or 0.1%, or 0.5%, 1%, 5%, 10%, 20%, 30%, 40%, 50%, 60%, 70%, 80%, 90%, 100%, 150%, 200%, 250%, 300%, 350%, 400%, 500%, 1,000%, 1,500%, 2,000%, and so on up to about .5,000% greater than the effective diameter of the plurality of nanoparticles, including an value in between, and fractions thereof.

In some embodiments, the nanoparticles are prevented from agglomerating when subjected to heating, for example, in some embodiments, a barrier coating that encapsulates the plurality of nanoparticles can be useful in applications where reactant access to the NPs is not employed. For example, in electromagnetic interference (EMI) shielding applications, the barrier coatings can be transparent to electromagnetic radiation, but the NPs can effectively absorb the BM radiation. This absorption can cause the NPs to heat; thus, the barrier coating can prevent sintering in such instances. In some embodiments, the barrier coating can encapsulate the plurality of NPs without denying access to the particle when, for example, a porous barrier coating is employed. In such embodiments, although the particle is technically encapsulated, the porous nature of the barrier coating allows access to reactive surfaces of the NP.

In some embodiments, the plurality of nanoparticles can be embedded partially in the barrier coating providing a physical boundary between the nanoparticle and the substrate, as shown in FIG. 1. In other embodiments, the embedded nanoparticles can be in surface contact with substrate, as shown in FIG. 12. In still further embodiments, the embedded nanoparticles can be a mixture of a first portion separated from the substrate and a second portion and in surface contact with the substrate. In some applications it can be beneficial to avoid direct surface contact between the substrate and the nanoparticles. For example, with a metal substrate and a metal nanoparticle, partial embedding of the nanoparticle can help avoid formation of alloys when the nanoparticle is exposed to high temperatures. Similarly, in the case of CNT growth with transition metal nanoparticle catalysts, it can be useful to separate the catalyst from a carbon rich substrate that might react with the nanoparticle.

In some embodiments, the nanoparticles are completely encapsulated in the barrier coating, but an exposed surface is created through a number of subsequent processes. For example, when fully curing the barrier coating some materials can form fissures in the coating in the vicinity of nanoparticles which can provide an interlace between the nanoparticles and a reactive environment. Other barrier coating materials can create the necessary access to the nanoparticles through the formation of a porous cured structure.

In some embodiments, fully encapsulated nanoparticles can be treated with a plasma to roughen the surface of the barrier coating and create exposed nanoparticle surfaces. Similarly, the barrier coating with encapsulated nanoparticles can be treated with a wet chemical etching agent for a period sufficient to expose a portion of the surface of the nanoparticles.

In still further embodiments, fully encapsulated nanoparticles can be treated under mechanical roughening conditions to expose a portion of the surface of the nanoparticles. This can be done through any physical abrasive method such as sand blasting, laser ablation, ball milling, plasma etching, and the like.

Regardless of the degree with which the nanoparticles are embedded in the barrier coating, the barrier coating can serve to mechanically lock the nanoparticles in place to prevent their agglomeration or sintering when subjected to heat. Without being bound by theory, this is accomplished by restricting the movement of the nanoparticles on the substrate surface reducing NP diffusion. Thus, the nanoparticle-to-nanoparticle interaction is substantially reduced or eliminated by the presence of the barrier coating.

The barrier coating can also provide a thermal barrier for use with low melting substrates. In this regard, the barrier coating can minimize or reduce to zero the surface area contact between the plurality of nanoparticles and the substrate to mitigate the effects of the exposure of the substrate to temperatures which the nanoparticles might be heated or, more generally, to avoid exposure of the substrate to the reaction environment to which the plurality of nanoparticles can be at least partially exposed.

In some embodiments the thickness of the barrier coating is generally chosen to be about equal to, less than, or slightly less than the effective diameter of the plurality of nanoparticles so that there remains an exposed nanoparticle surface for subsequent, exposure to a reaction environment. In other embodiments, the thickness can also be more than the effective diameter of the nanoparticles by employing any number of techniques described above to create an exposed surface of the nanoparticles. In some embodiments, the thickness of the barrier coating is between about 0.1 nm and about 100 nm. In some embodiments, the thickness can be less than 10 nm. Including 1 nm, 2 nm, 3 nm, 4 nm, 5 nm, 6 nm, 7 nm, 8 nm, 9 nm, and any value in between. The exact choice of barrier coating thickness can be chosen to approximately match or be less than the effective diameter of the plurality of nanoparticles. In some embodiments, the embedded plurality of nanoparticles maintains an exposed surface even when the nanoparticles are in surface contact with the substrate. In some embodiments, the thickness of the barrier coating coats is such that it covers about half the nanoparticle surface area. In some embodiments, the thickness of the barrier coating covers about 10% of the nanoparticle surface area, while in other embodiments, the thickness of the barrier coating covers about 5%, 10%, 15%, 20%, 25%, 30%, 35%, 40%, 45% 50%, 55%, 60%, 65%, 70%, 75%, 80%, 85%, 90%, 95%, 98%, and 100% of the surface area of the nanoparticles, including all values In between. In still other embodiments, the barrier coating covers the nanoparticle when applied but a portion of the nanoparticle is exposed upon further treatments or choice of porous barrier coating.

In some embodiments, the methods of the invention can include treating the substrate with a plasma prior to conformally depositing the barrier coating. Treating the substrate in a plasma process can serve a dual role of creating functional groups and toughening the substrate surface, thereby increasing its effective surface area, to improve the wetting properties of the substrate and thus improve the conformal deposition of die barrier coating. Substrate surface modification can be achieved using a plasma of any one or more of a variety of different gases, including, without limitation, argon, helium, oxygen, ammonia, hydrogen, and nitrogen.

In some embodiments, the step of depositing the barrier coating is accomplished by a technique selected from dip coating and spraying. Thus, the barrier coating can be solution based and applied via dip bath configuration, spray methods, or the like in some embodiments. The exact choice of method can be dictated by a number of factors, including, for example, the substrate geometry. For irregular shaped substrates, it can be useful to employ dip methods that avoid the use of directionally applied barrier coatings, such as in spray applications. For substrates in which a single side should be coated, such as a wafer substrate, it can be useful to apply the barrier coating with spray or related techniques (nebulizers, for example) to assure coating on only one side. Other factors to consider in applying the barrier coating can depend on the barrier coating material itself including, for example, the ability to form solutions or homogenous suspensions for dip or spray coating.

When applying the barrier coating via dip or spray methods, for example, the thickness of the barrier coating can be controlled by use of diluents. Diluents can include any solvent compatible with both the substrate and nanoparticle materials. For dip coating, in particular, the thickness of the barrier coating can be a function of concentration of the barrier coating material and the residence time in the dip bath. The residence time can also aid in providing uniformity of the coating. Uniformity can also be insured by employing multiple dip baths.

The barrier coating includes a material selected from a siloxane, a silane, an alumina, a silicon carbide ceramic, a metal, and mixtures thereof. In some embodiments, the choice of barrier coating can be chosen for its ability to adhere to the substrate. There are many types of barrier coating materials including, for example, those that are siloxane-based, silane-based, alumina-based silicon carbide-based ceramics, and metallic based. Alumina based materials include, for example, alumoxane, alumina nanoparticles, and alumina coating solutions, including, for example, alumina-based coatings available from Zircar Ceramics, such as Alumina Rigidizer/Hardener Type AL-R/H. In some embodiments, glass coatings such as spin on glass, glass nanoparticles, or siloxane-based solutions, such as methyl siloxane in isopropyl alcohol, can be used as barrier coating materials. Metallic based barrier coatings useful in the invention include, for example, molybdenum, aluminum, silver, gold, and platinum. Silcon carbide based ceramics include, for example, SMP-10, RD-212a, Polyaramic RD-684a and Polyaramic RD-688a available from Starfire.

Barrier coatings can also act as-multifunctional coatings tailored to specific applications. A specific type of barrier coating can be selected to both prevent sintering as well as promote adhesion to the substrate. For composite applications, a barrier coating can selected to prevent sintering as well as bond well to the composite matrix material, in still further embodiments, the barrier coating material can be selected for adhesion both to the substrate as well a composite matrix material. In yet further embodiments, more than one barrier coating can be employed. A first barrier coating can be selected for its ability to adhere to the substrate surface. A second barrier coating can be selected for its ability to adhere, for example, to a composite matrix material such as a resin, ceramic, metal, or the like.

In some embodiments, methods of the invention include partially curing the barrier coating prior to embedding said plurality of nanoparticles. Partial curing of the barrier coating can provide a "sticky" surface to embed the nanoparticles while preventing movement of the applied nanoparticles to minimize particle-to-particle interaction. Partial curing can also be caused by the method used to apply the nanoparticles to the barrier coating. In such a case, the partial coring step and embedding step are performed simultaneously. Partial curing temperatures are generally below the normal cure temperature, and can include temperature that are between about 50 in about 75% of the normal cure temperature and for residence times on the order of seconds.

In some embodiments, methods of the present invention further include heating the environment about the embedded plurality of nanoparticles, in the presence of a feedstock material, to a temperature promoting growth of a plurality of nano structures from the feedstock-material. In some embodiments, the embedded plurality of nanoparticles can catalyze the growth of the nanostructures. In some embodiments, the nanoparticles act as a seed for growth of the nanostructure, without behaving as a true catalyst. In still further embodiments, the nanoparticles catalyze a reaction which does not alter the substrate, barrier coating, or the nanoparticles. Thus, the nanoparticle can catalyze a gas phase reaction in which the products remain in the gas phase, for example. In some embodiments, the temperature of a given reaction is sufficient to cause agglomeration of the plurality of nanoparticles in the absence of the barrier coating. Thus, the barrier coating provides an effective means for preventing sintering.

In some embodiments, the nanoparticles include a transition metal. The catalyst transition metal nanoparticle can be any d-block transition metal, as described above. In addition, the nanoparticles can include alloys and non-alloy mixtures of d-block metals in elemental form or in salt form, and mixtures thereof. Such salt forms include, without limitation, oxides, carbides, and nitrides. Non-limiting exemplary transition metal NPs Include Ni, Fe, Co, Mo, Cu, Pt, Au, and Ag and salts thereof, such as acetates and chlorides, and mixtures thereof. In some embodiments, the transition metal is used as a CNT forming catalyst. Many of these transition metal catalysts are readily commercially available from a variety of suppliers, including, for example, Ferrotec Corporation (Bedford, N.H.).

In some embodiments, the feedstock material is a carbon source, which when used in conjunction with the aforementioned transition metals, allows for the synthesis of nanostructures such as carbon nanotubes (CNTs). These CNTs can be single-walled, double-walled, or other multi-walled CNTs. One skilled in the art will recognize the relationship between nanoparticle size and the type of CNTs that can be grown. For example, single-walled CNTs are normally accessible with nanoparticle catalysts less than about 1 nm. CNT growth conditions are typically between about 500 to about 1,000° C., a temperature at which sintering is observable and can impact successful CNT growth.

Many substrate types, such as carbon and stainless steel, are not normally amenable to CNT growth of high yields when only a catalyst nanoparticle is applied to the surface due to high levels of sintering. Barrier coatings are useful, however, for high-yield CNT growth, even on these challenging substrates.

On the surface of a substrate, a catalyst nanoparticle's ability to nucleate CNT growth can depend on the presence of sufficient barrier coating material at that location of the substrate surface to substantially reduce or prevent sintering. CNT growth can be performed when the catalyst nanoparticles are applied to the substrate prior to the barrier coating ('reverse order'). The benefit of a 'reverse order' process is that the barrier coating keeps the catalyst locked onto the substrate, and therefore allows for anchoring of the CNTs to the substrate surface. Without being bound by theory, when barrier coating is applied prior to catalyst coating the CNT nanoparticle catalyst tends to follow the leading edge of CNT synthesis, that is, tip-growth results. The 'reverse order' coatings can promote base-growth.

In some embodiments, the feedstock can be a carbon source mixed with other gases as might be found, for example, in a combustion process. In such embodiments, embedded transition metal nanoparticles, such as platinum, palladium, rhodium, cerium, manganese, iron, nickel, or copper can be used to modulate the oxidation of the carbon source. The favorable surface area to volume of a nanoparticle can improve the catalytic performance in such combustion processes. This type of reaction can find application, for example, in catalytic converters. It can also be useful in various industrial petroleum processes such as in refining and in downhole operations to catalyze the cracking of heavy hydrocarbons for enhanced oil recovery, thus maximizing formation productivity.

In some embodiments, other uses of transition metal nanoparticles include the manufacture of high density magnetic recording media that employ FePt nanoparticles. One skilled in the art will recognize that sintering of FePt nanoparticles is problematic when attempting to induce phase the change to obtain the useful face-centered tetragonal FePt structure. This phase change is generally conducted by heating at about 550° C. and is accompanied by sintering. The barrier coatings disclosed herein are useful in preventing this sintering.

In some embodiments, a transition metal nanoparticle can be used in desulfurization processes. For example, nickel, and molybdenum catalysts have been used in the desulfurization of bitumen. In such processes, expensive supports such as uranium, oxide have been employed to prevent sintering during recycle of the catalyst. Methods of the present invention employing a barrier coating can be employed to prevent such sintering, while avoiding the use of expensive support materials.

In some embodiments, a transition metal nanoparticle can be used in syngas production processes. It has been determined that sintering of $CeO_2$ in Rh—$CeO_2$ catalysts limits the use of this catalyst system. The barrier coating employed in methods disclosed herein can be used to prevent this sintering and enhance the biomass to syngas transformation, for example.

In some embodiments, the nanoparticles can include other metal containing materials such as ceramics, for example, oxides, carbides, borides, of zinc, titanium, aluminum, and the like. Other materials that do not contain transition metals such as clays, silica, silicates, aluminosilicates and the like can also be used.

Any of the aforementioned nanoparticles can range in size from between about 0.1 nm to about 100 nm. In some embodiments, the size of the nanoparticles can be in a range from between about 1 to about 75 nm, and between about 10 to 50 nm in other embodiments. In some embodiments, the size of the nanoparticles is in a range from between about 0.1 to about 1 nm. In other embodiments, the size of the nanoparticles is in a range from between about 2 to about 10 nm. In still further embodiments, the size of the nanoparticles is in a range from between about 10 to about 20 nm, from between, about 20 to about 30 nm, from between about 30 to about 40 nm, from between about 40 to about 50 nm, from between about 50 to about 60 nm, from between about 60 to about 70 nm, from between about 70 to about 80 nm, from between about 80 to about 90 nm, and from between, about 90 to about 100 nm, including all values in between. The choice of size can depend on the application. In catalytic processes, as described above, it can be desirable to utilize smaller particles to benefit from the larger surface area to volume. More generally, at the nanoparticle scale, one skilled in the art will recognize the quantized nature of the properties of the nanoparticles and that an appropriate size can be determined through theoretical considerations and calculations. For example, a particular particle size can be designed to absorb specific wavelengths of radiation.

The rate of sintering of a metallic nanoparticles can vary depending on the substrate on which it is disposed. However, by employing the barrier coatings in methods of the present invention, any substrate type can be used. For example, the substrate can include a metal, a ceramic, a silica wafer, a fiber, a graphite sheet, high temperature plastics, such as polyimides, PEEK, PEI and the like.

In some embodiments, the present invention provides a method that includes: (a) depositing a plurality of nanoparticles on at least one surface of a substrate; (b) conformally depositing a barrier coating over the substrate and at least a portion of each of the plurality of nanoparticles, creating an embedded portion of each of the plurality of nanoparticles; the barrier coating is provided in liquid form; and (c) fully curing the barrier coating. The plurality of nanoparticles are in surface contact with the substrate in such embodiments, and the embedded portion of each of the plurality of nanoparticles is in continuous contact with the cured barrier coating. This is described above as "reverse order" process and is shown graphically in FIG. 2. In this configuration, the barrier coating can also prevent the agglomeration of the plurality of nanoparticles when exposed to heat, or other processes that might cause sintering. As described above, the thickness of the barrier coating can be about the same or slightly less than the effective diameter of the plurality of nanoparticles allowing the plurality of nanoparticles to maintain an exposed portion of their surface. Alternatively the thickness of the barrier coating can be greater than effective diameter of the plurality of nanoparticles. In some embodiments, the methods described above tor post barrier coating handling can be used when the barrier coating encapsulates the nanoparticles completely.

When employing the "reverse order" process, the substrate can be treated with a plasma prior to depositing the plurality of nanoparticles. This can provide the exposed substrate surface with good wetting characteristics as described above. Similarly, the step of depositing the barrier coating can be accomplished by a technique selected from dip coating and spraying as described above. Moreover, any of the above applications, conditions and general, considerations apply equally to the "reverse order" methods of the invention.

The methods of the invention can be used to produce an article that includes a substrate having a barrier coating conformally disposed on at least one surface of the substrate and a plurality of nanoparticles embedded in the barrier coating. The barrier coating function can be to prevent the agglomeration of the plurality of nanoparticles when subjected to heat or other chemical and/or physical processes.

The thickness of the barrier coating in articles of the invention can be about the same or slightly less than the effective diameter of said plurality of nanoparticles allowing said plurality of nanoparticles to maintain an exposed portion of their surface when said nanoparticles are, optionally, in surface contact with the substrate. In particular embodiments, the embedded plurality of nanoparticles are in surface contact with the substrate. Articles of the invention can include a substrate that is a metal, ceramic, silica wafer, fiber, graphite sheet, and high temperature plastic, as describe above.

Any of the nanoparticle types and sizes described above can be used in connection with the articles of the invention. In some embodiments, articles of the invention include, composite materials having a matrix material and carbon nanotubes infused to a fiber, in combustion and related catalyst applications articles of the invention include a) catalytic converters, b) catalyst reaction beds used in refining, syngas production, desulfurization and the like, c) downhole tools used in oil recovery, and d) high density storage media.

It is understood that modifications which do not substantially affect the activity of the various embodiments of this invention are also included within the definition of the invention provided herein. Accordingly, the following examples are intended to illustrate but not limit the present invention.

EXAMPLE 1

This example shows how a barrier layer can be used in a ceramic fiber composite structure to prevent sintering of iron nanoparticles applied to the ceramic fiber surface for enhanced signature control characteristics.

Figure 14:
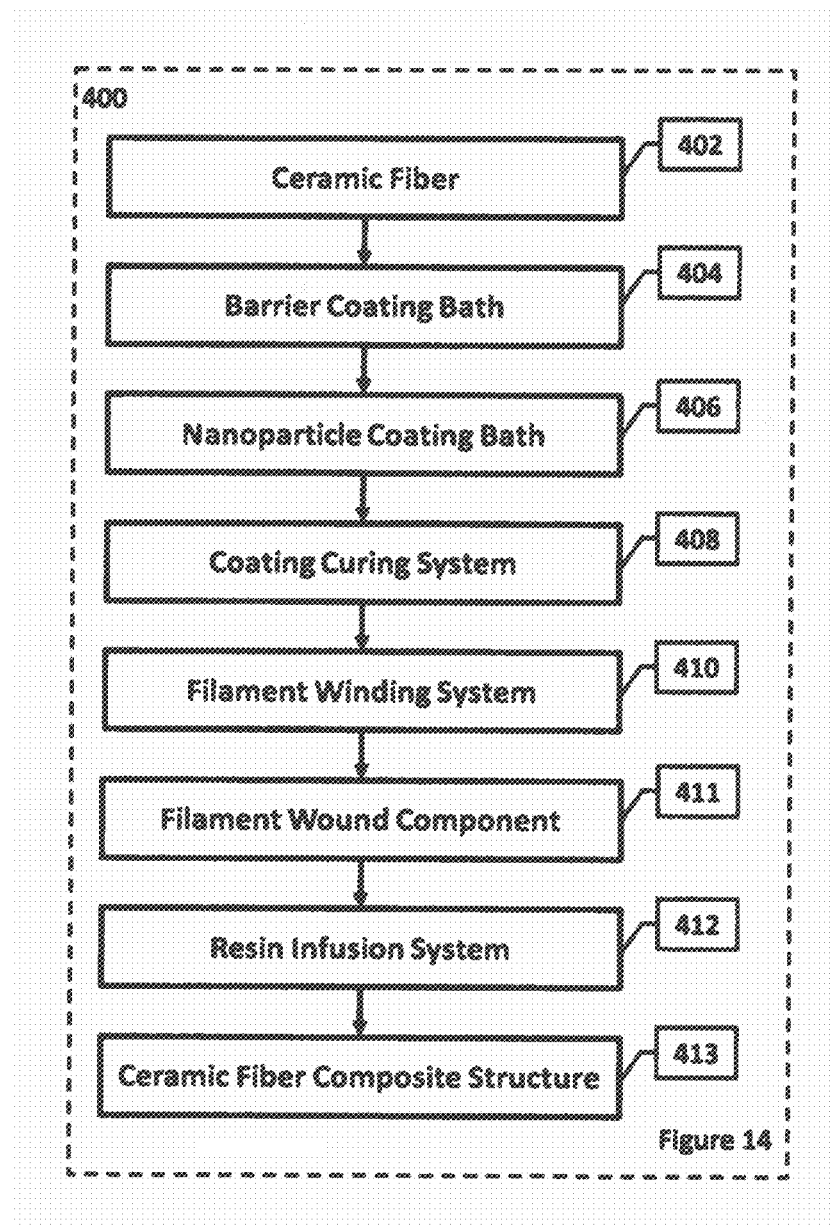
FIG. 14 shows a system for producing a high temperature ceramic fiber composite with enhanced signature control characteristics.

FIG. 14 depicts system 400 for producing a high temperature ceramic fiber composite with enhanced signature control characteristics in accordance with the illustrative embodiment of the present invention. System 400 includes a ceramic fiber 402, barrier coating solution, bath 404, nanoparticle solution bath 406, coating cluing system 408, filament winding system 410, and a resin infusion system 412, interrelated as shown.

The ceramic fiber 402 used is a Silicon Carbide Sylramic™ fiber tow (1600 denier-10 micron diameter) (COI Ceramics, Inc).

A barrier coating 404, consisting of the Starfire SMP-10, RD-212a solution is applied to the ceramic fiber 402 via a dip process. A diluted solution of 1 part SMP-10 and 10 parts isopropyl alcohol is used in the dip process to apply a 2-4 nm thick coating.

The nanoparticle solution 406 used is GTP 9700 (Nano-Chemonics), an iron, oxide nanoparticle mixed in a toluene solution. The nanoparticle solution is used to apply a uniform distribution of iron oxide nanoparticles on the surface of the barrier coating 404. Solutions containing less than 10% iron oxide by weight is used to create nanoparticle coatings with 20-40 nm spaced nanoparticles.

The coating curing system 408 consists of a set of heaters used to cure the combine barrier and nanoparticle coating 409. The coated fiber is exposed to a temperature of 200° C. for 2 hours along with a platinum-based catalyst to aid in the curing process.

The cured coating locks the nanoparticles into position, and the coated fiber is wound into a component using the filament winding system 410.

The filament wound component 411 is then infused with a bismaleimide matrix using the resin infusion system 412.

The final cured high temperature ceramic fiber composite structure 413 is able to withstand brief high temperature exposure as high as 600° C. while maintaining signature control characteristics which are imparted due to the dispersed iron oxide nanoparticle coating. This nanoparticle coating will not sinter as a result of its interaction with the cured barrier coating.

EXAMPLE II

This example shows how carbon nanotubes (CNTs) can be grown on the surface of a carbon fiber using a barrier coating to prevent sintering of the iron nanoparticle catalyst.

Figure 15:
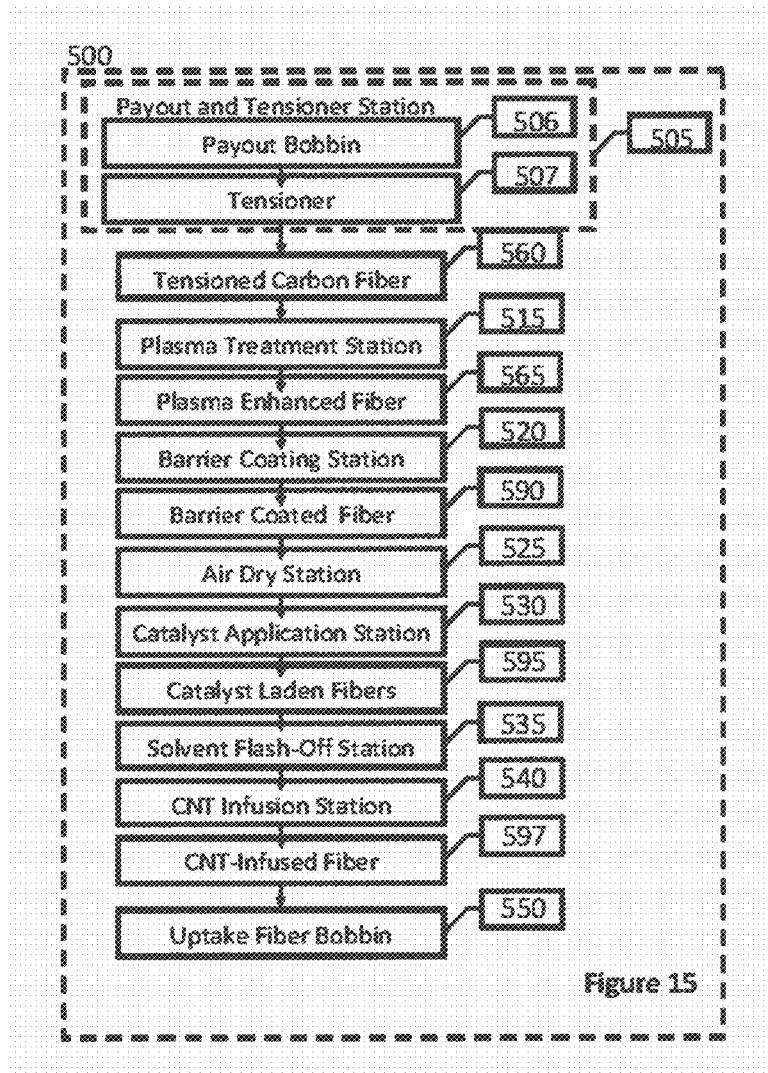
FIG. 15 shows a system for producing CNTs on carbon fiber.

FIG. 15 depicts system 500 for producing CNTs on carbon fiber (34-700 12k unsized carbon fiber tow with a tex value of 800—Grafil Inc., Sacramento, Calif.) in accordance with the illustrative embodiment of the present invention. System 500 includes a carbon fiber material payout and tensioner station 505. plasma treatment station 515, barrier coating application station 520, air dry station 525, catalyst application station 530, solvent flash-off station 535, CNT-growth station 540, and carbon fiber material uptake bobbin 550, interrelated as shown.

Payout and tension station 505 includes payout bobbin 506 and tensioner 507. The payout bobbin delivers an unsized carbon fiber material 500 to the process; the fiber is tensioned via tensioner 507. For this example, the carbon fiber is processed at a linespeed of 2 ft/min.

Unsized fiber 560 is delivered to plasma treatment station 515. For this example, atmospheric plasma treatment is utilized in a 'downstream' manner from a distance of 1 mm from the spread carbon fiber material. The gaseous feedstock is comprised of 100% helium.

Plasma enhanced fiber 565 is delivered to barrier coating station 520, in this illustrative example, a siloxane-based barrier coating solution is employed in a dip coating configuration. The solution is 'Accuglass T-11 Spin-On Glass' (Honeywell International inc., Morristown, N.J.) diluted in isopropyl alcohol by a dilution rate of 40 to 1 by volume. The resulting barrier coating thickness on the carbon, fiber material is approximately 40 nm. The barrier coating can be applied at room temperature in the ambient environment.

Barrier coated carbon fiber 590 is delivered to air dry station 525 for partial curing of the nanoscale barrier coating. The air dry station sends a stream of heated air across the entire carbon fiber spread. Temperatures employed can be in the range of 100° C. to about 500° C.

After air drying, barrier coated carbon fiber 590 is delivered to catalyst application station 530. In this example, an iron oxide-based CNT forming catalyst solution is employed in a dip coating configuration. The solution is 'EFH-1' (Ferrotec Corporation, Bedford, N.H.) diluted in hexane by a dilution rate of 200 to 1 by volume. A monolayer of catalyst coating is achieved on the carbon fiber material, 'EFH-1' prior to dilution has a nanoparticle concentration ranging from 3-15% by volume. The iron oxide nanoparticles are of composition $Fe_2O_3$ and $Fe_3O_4$ and are approximately 8 nm in diameter.

Catalyst-laden carbon fiber material 595 is delivered to solvent flash-off station 535. The solvent flash-off station sends a stream of air across the entire carbon fiber spread. In this example, room temperature air can be employed in order to flash-off all hexane left on the catalyst-laden carbon fiber material.

After solvent flash-oil, catalyst-laden fiber 595 is finally advanced to CNT-growth station 540. In this example, a rectangular reactor with a 12 inch growth zone is used to employ CVD growth at atmospheric pressure. 98.0% of the total gas flow is inert gas (Nitrogen) and the other 2.0% is the carbon feedstock (acetylene). The growth zone is held at 750° C. For the rectangular reactor mentioned above, 750° C. is a relatively high growth temperature. The addition, of the barrier coating prevents sintering of the catalyst nanoparticle at CNT growth temperatures, allowing for effective high density CNT growth on the surface of the carbon fiber.

CNT coated fiber 597 is wound about uptake fiber bobbin 550 for storage. CNT coated fiber 597 is loaded with CNTs approximately 50 μm in length and is then ready for use in composite materials.

It is to be understood that the above-described embodiments are merely illustrative of the present invention and that many variations of the above-described embodiments can be devised by those skilled in the art without departing horn the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other processes, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment" "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is the following:
1. A method comprising:
depositing a barrier coating on a substrate comprising a plurality of fibers, the barrier coating being deposited in a liquid form that is uncured;

wherein the barrier coating is a thermal insulator, wherein the barrier coating comprises a substance selected from the group consisting of an alumoxane, spin on glass, and glass nanoparticles;

partially curing the barrier coating;

applying a plurality of catalyst nanoparticles to the partially cured barrier coating;

anchoring the plurality of catalyst nanoparticles to the barrier coating;

further curing the barrier coating; and growing a plurality of carbon nanotubes on the substrate, the carbon nanotubes extending from the further cured barrier coating.

2. The method of claim 1, further comprising:

treating the substrate with a plasma before depositing the barrier coating thereon.

3. The method of claim 1, wherein the substrate is provided from a payout system and is rewound following growth of the plurality of carbon nanotubes thereon.

4. The method of claim 1, wherein the barrier coating has a thickness ranging between about 10 nm to about 100 nm.

5. The method of claim 1, wherein the barrier coating is further cured while growing the plurality of carbon nanotubes on the substrate.

6. The method of claim 1, further comprising:

spreading the plurality of fibers before depositing the barrier coating thereon.

7. The method of claim 1, wherein the barrier coating is deposited by spray coating or dip coating.

8. The method of claim 1, wherein the carbon nanotubes are oriented perpendicular to the substrate.

* * * * *